(12) United States Patent
Kato

(10) Patent No.: US 7,711,962 B2
(45) Date of Patent: May 4, 2010

(54) DATA TRANSMISSION SYSTEM, DATA TRANSMISSION METHOD, AND DEVICE

(76) Inventor: Makoto Kato, 1-36-1-1318, Higashi-Kanamachi, Katsushika-ku, Tokyo 125-0041 (JP)

( * ) Notice: Subject to any disclaimer, the term of this patent is extended or adjusted under 35 U.S.C. 154(b) by 1086 days.

(21) Appl. No.: 10/542,009

(22) PCT Filed: Jan. 19, 2004

(86) PCT No.: PCT/JP2004/000369

§ 371 (c)(1),
(2), (4) Date: Mar. 14, 2006

(87) PCT Pub. No.: WO2004/066508

PCT Pub. Date: Aug. 5, 2004

(65) Prior Publication Data

US 2006/0239455 A1    Oct. 26, 2006

(30) Foreign Application Priority Data

Jan. 17, 2003    (JP)    ............... 2003-010183

(51) Int. Cl.
*G06F 11/30*    (2006.01)
*G06F 12/14*    (2006.01)
(52) U.S. Cl. .................................................. 713/187
(58) Field of Classification Search ............ 713/187
See application file for complete search history.

(56) References Cited

U.S. PATENT DOCUMENTS

| | | | |
|---|---|---|---|
| 5,784,566 A * | 7/1998 | Viavant et al. ............ 709/229 |
| 6,584,562 B1 * | 6/2003 | Fiori ........................ 713/151 |
| 7,146,009 B2 * | 12/2006 | Andivahis et al. ........... 380/277 |
| 7,181,017 B1 * | 2/2007 | Nagel et al. ................. 380/282 |
| 7,228,412 B2 * | 6/2007 | Freed et al. ................. 713/153 |
| 2003/0014623 A1 * | 1/2003 | Freed et al. ................. 713/150 |
| 2003/0014650 A1 * | 1/2003 | Freed et al. ................. 713/189 |
| 2003/0016821 A1 * | 1/2003 | Hammersmith .............. 380/37 |
| 2003/0074413 A1 * | 4/2003 | Nielsen et al. .............. 709/206 |
| 2003/0147536 A1 * | 8/2003 | Andivahis et al. ........... 380/277 |

FOREIGN PATENT DOCUMENTS

| | | |
|---|---|---|
| JP | 5-160829 | 6/1993 |
| JP | 10-341223 | 12/1998 |
| JP | 2000-165377 | 6/2000 |

* cited by examiner

*Primary Examiner*—Christian LaForgia
(74) *Attorney, Agent, or Firm*—Bacon & Thomas, PLLC

(57) ABSTRACT

An apparatus (1) on a sending side sends a first signal (S1) containing encrypted data that was encrypted using conversion constants (Y, Zy'), and a conversion constant (X) to an apparatus (1) on the receiving side; the apparatus (1) on the sending side sends a second signal (S2) containing encrypted data that was encrypted using conversion constants (X, Zy'), and a conversion constant (Y), and pattern-conversion constants (Zy) that correspond to conversion constant (Zy') to a relay apparatus (2). The relay apparatus (2) transfers a second' signal (S2') in which a pattern-conversion constant (Zy) in the second signal (S2) has been converted to a conversion constant (Zy') to the apparatus (1) on the receiving side. The apparatus (1) on the receiving side reads the encrypted data and conversion constants (X, Y, Zy') from the first signal (S1) and second' signal (S2'), then decodes and authenticates the encrypted data.

29 Claims, 19 Drawing Sheets

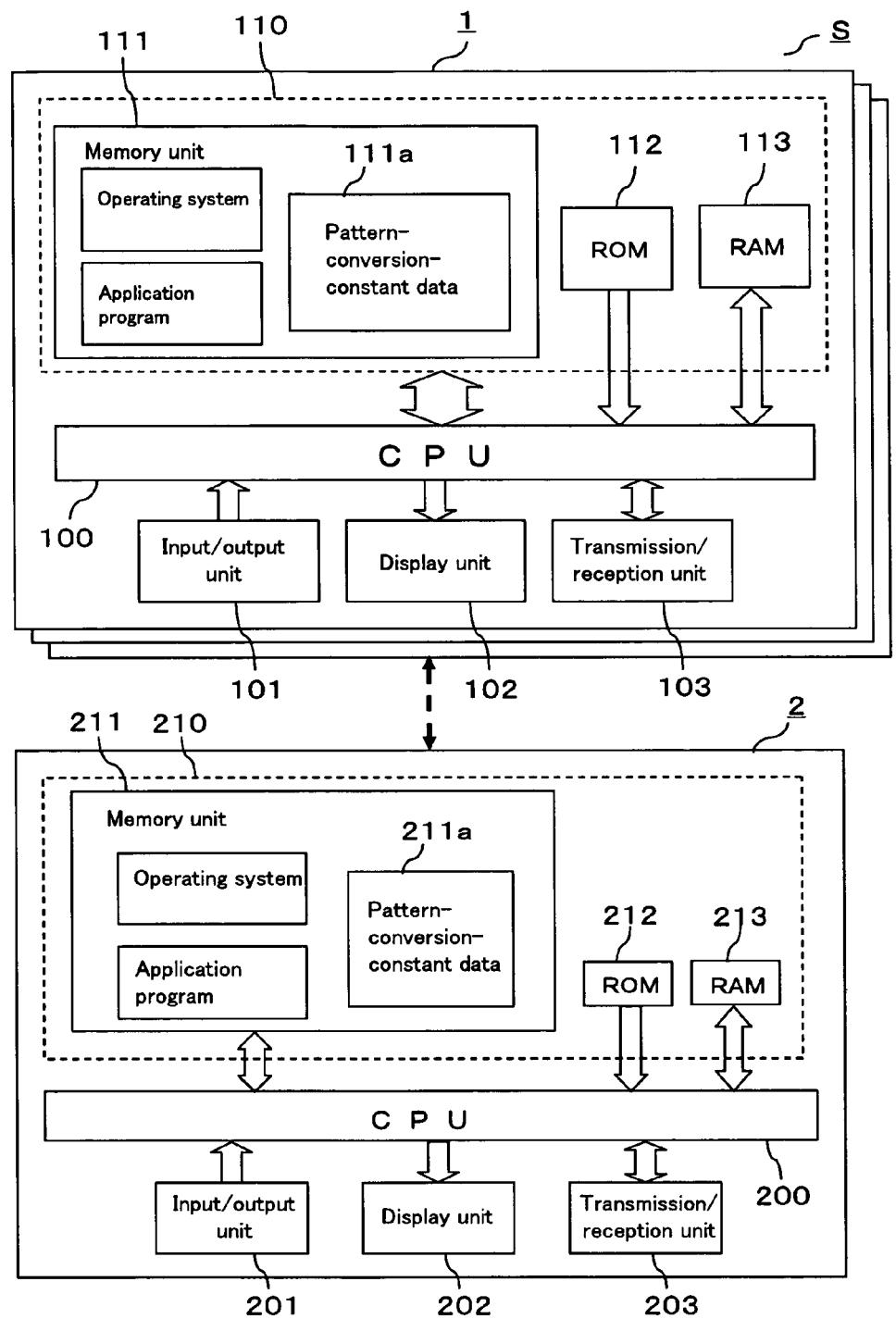

Fig.5

Signal encryption

A(personal authentication number):1234 5678 9012   B(shipment authentication number):0312 3456 7890   C(control data):20000

| Encryption data | | Decoding equations | Example of signal encryption data |
|---|---|---|---|
| A personal ID data | First equation | Ax=A+Y+Zy´ | 1234 5723 7977 = (1234 5678 9012)+(44 5566)+(3399) |
| | Second equation | Ay=A+X+Zy´ | 1234 5701 5755 = (1234 5678 9012)+(22 3344)+(3399) |
| B shipment ID data | First equation | Bx=B+Y+Zy´ | 0312 3501 6855 = (0312 3456 7890)+(44 5566)+(3399) |
| | Second equation | By=B+X+Zy´ | 0312 3479 4633 = (0312 3456 7890)+(22 3344)+(3399) |
| C control data | First equation | Cx=C+Y+Zy´ | 46 8965 = (2 0000) +(44 5566)+(3399) |
| | Second equation | Cy=C+X+Zy´ | 24 6743 = (2 0000) +(22 3344)+(3399) |

X, Y, Zy´ :Conversion constants

Fig.6

First signal (encrypted signal)
A (personal authentication number) : 1234 5678 9012  B (shipment authentication number) : 0312 3456 7890  C (control data) : 20000

| Name | Operation number password | Communication number | Sender's address | Name | Conversion constant | | Substitute personal ID value | Substitute shipment ID value | Substitute control data value | Control pattern | Confidential data |
|---|---|---|---|---|---|---|---|---|---|---|---|
| Packet Number (PK No) | 0 | 1 | 2 | 3 | 4 | 5 | 6 | 7 | 8 | 9 | 10 |
| Signal | (OP) | T No | Ads | Nm | X | | Ax | Bx | Cx | Cp | Dt |
| Data input example | 0312 | 020001 | E-mail Address | xxxxxx | 22 3344 | | 1234 5723 7977 | 0312 3501 6855 | 46 8965 | b | Data Holder |
| | | Not sent | | | | | $Ax = (A+Y+Zy')$ | $Bx = (B+Y+Zy')$ $(C+Y+Zy')$ | $Cx = (C+Y+Zy')$ | | On Lock |

Fig.7

Second signal (encrypted signal)
A (personal authentication number): 1234 5678 9012   B (shipment authentication number): 0312 3456 7890   C (control data): 20000

| Name | | Communication number | Sender's address | Name | Conversion constant | Pattern-conversion constant | Substitute personal ID value | Substitute shipment ID value | Substitute control data value | | |
|---|---|---|---|---|---|---|---|---|---|---|---|
| Packet Number (PK No) | 0 | 1 | 2 | 3 | 4 | 5 | 6 | 7 | 8 | 9 | 10 |
| Signal | | T No | Ads | Nm | Y | Zy | Ay | By | Cy | | |
| Data input example | | 020001 | E-mail Address xxxxxx | 44 5566 | g | 1234 5701 5755 | 0312 3479 4633 | 24 6743 | | | |

Second' signal (conversion signal)
A (personal authentication number): 1234 5678 9012   B (shipment authentication number): 0312 3456 7890   C (control data): 20000

| Name | | Communication number | Sender's address | Name | Conversion constant | Pattern-conversion constant | Substitute personal ID value | Substitute shipment ID value | Substitute control data value | | |
|---|---|---|---|---|---|---|---|---|---|---|---|
| Packet Number (PK No) | 0 | 1 | 2 | 3 | 4 | 5 | 6 | 7 | 8 | 9 | 10 |
| Signal | | T No | Ads | Nm | Y | Zy | Ay | By | Cy | | |
| Data input example | | 020001 | E-mail Address | xxxxxx | 44 5566 | 3399 | 1234 5701 5755 | 0312 3479 4633 | 24 6743 | | |

Signal decoding

| Decoded data | Decoding equation | | Authentication |
|---|---|---|---|
| A personal ID data | First equation<br>Second equation | $Nm / Ax - Y - Zy' = A1$<br>$Nm / Ay - X - Zy' = A2$ | $A1 = A2$ |
| B shipment ID data | First equation<br>Second equation | $Bx - Y - Zy' = B1$<br>$By - X - Zy' = B2$ | $B1 = B2$ |
| C control data | First equation<br>Second equation | $Cx - Y - Zy' = C1$<br>$Cy - X - Zy' = C2$ | $C1 = C2$ |

Fig.12

Example of signal decoded data

A(personal authentication number):1234 5678 9012  B(shipment authentication number):0312 3456 7890  C(control data):20000

| | | | | | | |
|---|---|---|---|---|---|---|
| A personal ID data | First equation | Nm (xxxxxx) / (1234 5723 7977) | Ax –(44 5566) | Y –(3399) | Zy′ = | A1 xxxxx/1234 5678 9012 |
| | Second equation | Nm (xxxxxx) / (1234 5701 5755) | Ay –(22 3344) | X –(3399) | Zy′ = | A2 xxxxx/1234 5678 9012 |
| B shipment ID data | First equation | Bx (0312 3501 6855) | Y –(44 5566) | Zy′ –(3399) | = | B1 0312 3456 7890 |
| | Second equation | By (0312 3479 4633) | X –(22 3344) | Zy′ –(3399) | = | B2 0312 3456 7890 |
| C control data | First equation | Cx (46 8965) | Y –(44 5566) | Zy′ –(3399) | = | C1 2 0000 (¥20,000) |
| | Second equation | Cy (24 6743) | X –(22 3344) | Zy′ –(3399) | = | C2 2 0000 (¥20,000) |

First signal (encrypted signal)  A (personal authentication number) : 1234 5678  B (ON/OFF signal) : 1 or 0

Second signal (encrypted signal)  A (personal authentication number) : 1234 5678  B (ON/OFF signal) : 1 or 0

DATA TRANSMISSION SYSTEM, DATA TRANSMISSION METHOD, AND DEVICE

BACKGROUND OF THE INVENTION

1. Field of the Invention

This invention relates to a data-transmission system, data-transmission method and data-transmission apparatus that together with making it difficult to decode data that leaks during transmission, makes it possible to avoid problems that may occur due to transmission from a third party impersonating the true sender.

2. Description of the Related Art

Conventionally, technology has existed in which data to be sent by a sender is encrypted, and that encrypted data and an encryption key for decoding that encrypted data are sent to the recipient using separate lines (for example, a satellite communication line and ground line). (Refer to Japanese Patent No. 3,052,322)

The recipient receives the encrypted data and encryption key, and from these is able to decode the data into the original data. By sending the encrypted data and encryption key using separate lines in this way, it is possible to improve confidentiality of the data transmission.

However, since the recipient receives the data without authenticating the sender of the encryption key and encrypted data, it has not been possible to authenticate the sent data even in the case when sent by a third party that poses as the sender who originally sent the data.

For communication lines such as the Internet, individual-authentication services are available from authentication-service companies that perform individual authentication. However, the individual-authentication services provided by this kind of authentication service company are expensive, and thus have not been suitable for individual use.

SUMMARY OF THE INVENTION

In order to solve the aforementioned problems, the object of the present invention is to provide a data-transmission system, data-transmission method and data-transmission apparatus that makes it possible for the recipient to authenticate sent data and prevent any problems due to fraudulent transmissions even when data is sent by a third party posing as the original sender.

The data-transmission system of this invention is a data-transmission system that sends transmission data, which has been encrypted by using at least one conversion constant from among a first conversion constant, second conversion constant and third conversion constant, from an apparatus on the sending side to an apparatus on the receiving side, wherein the apparatus on the sending side comprises: a conversion-constant selection unit that selects a first conversion constant, second conversion constant and third conversion constant; an encryption unit that uses the second conversion constant, or second conversion constant and third conversion constant to encrypt the transmission data to a first substitute value, and uses the first conversion constant, or the first conversion constant and third conversion constant to encrypt the transmission data to a second substitute value; a first-signal-generation unit that generates a first signal that contains the first substitute value and first conversion constant; a memory unit that stores a pattern-conversion constant that corresponds to the third conversion constant; a second-signal-generation unit that generates a second signal that contains the second substitute value, second conversion constant and pattern-conversion constant; and a transmission unit that sends the first signal to the apparatus on the receiving side and the second signal to a relay apparatus; the relay apparatus comprises: a memory unit that stores the third conversion constant that corresponds to the pattern-conversion constant; a signal-generation unit that receives the second signal, and converts the pattern-conversion constant contained in that second signal to the third conversion constant to generate a second' signal; and a transmission unit that sends the second' signal to the apparatus on the receiving side; and the apparatus on the receiving side comprises: a reading unit that receives the first signal from the apparatus on the sending side and the second' signal from the relay apparatus, and reads the first substitute value and first conversion constant from the first signal, and reads the second substitute value, second conversion constant and third conversion constant from the second' signal; a decoding unit that uses the conversion constants that were used in encrypting the first substitute value and second substitute value and decodes the first substitute value and second substitute value to first decoded data and second decoded data; and an authentication unit that authenticates the first signal and second' signal from the first decoded data and second decoded data.

As described above, with this invention, the second conversion constant that was used to encrypt the encrypted data contained in the first signal is contained and sent in the second signal, and the first conversion constant that was used to encrypt the encrypted data contained in the second signal is contained and sent in the first signal.

Furthermore, the third conversion constant itself is not sent, however a pattern-conversion constant that corresponds to the third conversion constant is contained in the second signal and sent to the relay apparatus. Also, by having the relay apparatus convert this pattern-conversion constant to a third conversion constant, the relay apparatus converts the second signal to a second' signal and transfers it to the receiving side.

By performing transmission in this way, even though a third party may obtain both the first signal and second signal, the pattern-conversion constant is unknown, so it is not possible to decoded the transmission data. Also, even though a third party obtains either the first signal or second' signal, not all of the conversion constants are contained in one signal, so it is not possible to decode the transmission data.

Furthermore, even though a third party may obtain both the first signal and second' signal, as long as that third party does not obtain the decoding method, it is not possible to obtain meaningful decoded data.

As described above, with this invention, even though a third party may improperly obtain encrypted data, it is not possible for that third party to decode that encrypted data meaningfully, and thus it is possible to improve the confidentiality of the transmission data.

Moreover, it is possible for the apparatus on the receiving side to decode the encrypted data without knowing the pattern-conversion constant selected by the apparatus on the sending side. Therefore, by setting a plurality of combinations of pattern-conversion constants and conversion constants by the apparatus on the sending side, it is possible to improve confidentiality even when sending encrypted data to a plurality of apparatuses on the receiving side.

Also, since the encryption method using conversion constants and the pattern-conversion constant are not known by a third party, it is not possible for the apparatus on the receiving side to perform decoding of meaningful data in the case a third party poses as the sender and sends a fraudulent transmission, or since the decoded data will not match, it is possible to avoid problems due to fraudulent transmission.

Also, the data-transmission system of this invention is a data-transmission system that sends transmission data, which has been encrypted by two conversion constants from among a first conversion constant, second conversion constant, third conversion constant, and fourth conversion constant, from an apparatus on the sending side to an apparatus on the receiving side, wherein the apparatus on the sending side comprises: a conversion-constant-selection unit that selects the first conversion constant, second conversion constant, third conversion constant and fourth conversion constant; an encryption unit that uses the second conversion constant and fourth conversion constant to encrypt the transmission data to a first substitute value, and uses the first conversion constant and third conversion constant to encrypt the transmission data to a second substitute value; a memory unit that stores first and second pattern-conversion constants that respectively correspond to the third conversion constant and fourth conversion constant; a first-signal-generation unit that generates a first signal that contains the first substitute value, first conversion constant, and the first pattern-conversion constant or the second pattern-conversion constant; a second-signal-generation unit that generates a second signal that contains the second substitute value, second conversion constant, and first pattern-conversion constant or second pattern-conversion constant that is not contained in the first signal; and a transmission unit that sends the first signal to a first relay apparatus and sends the second signal to a second relay apparatus; the first relay apparatus comprises: a memory unit that stores the third conversion constant or fourth conversion constant that corresponds to the first or second pattern-conversion constant; a signal-generation unit that receives the first signal and converts the pattern-conversion constant contained in that signal to the third conversion constant or fourth conversion constant to generate a first' signal; and a transmission unit that sends the first' signal to the apparatus on the receiving side; the second relay apparatus comprises: a memory unit that stores the third conversion constant or fourth conversion constant that corresponds to the first or second pattern-conversion constant, a signal-generation unit that receives the second signal and converts the pattern-conversion constant contained in that signal to the third conversion constant or fourth conversion constant to generate a second' signal; and a transmission unit that sends the second' signal to the apparatus on the receiving side; and the apparatus on the receiving side comprises: a reading unit that receives the first' signal and second' signal and reads the first substitute value, first conversion constant and third conversion constant or fourth conversion constant from the first' signal, and reads the second substitute value, second conversion constant and third conversion constant or fourth conversion constant from the second' signal; a decoding unit that uses the conversion constants that were used for encrypting the first substitute value and second substitute value to decode first substitute value and second substitute value to first decoded data and second decoded data, respectively; and an authentication unit that performs authentication of the first' signal and second' signal from the first decoded data and second decoded data.

In this way, with this invention, the first signal is also transferred to the apparatus on the receiving side by way of a relay apparatus. By doing so the confidentiality of the data transmission is further improved, and it is possible to more effectively remove any problems due to fraudulent transmission.

Also, the data-transmission system of this invention is a data-transmission system that sends transmission data, which has been encrypted using at least one conversion constant from among a first conversion constant, second conversion constant and third conversion constant, from an apparatus on the sending side to an apparatus on the receiving side, and wherein the apparatus on the sending side comprises: a constant-conversion-selection unit that selects the first conversion constant, second conversion constant and third conversion constant; an encryption unit that uses the second conversion constant, or the second conversion constant and third conversion constant to encrypt the transmission data to a first substitute value, and uses the first conversion constant, or the first conversion constant and third conversion constant to encrypt the transmission data to a second substitute value; a first-signal-generation unit that generates a first signal that contains the first substitute value and first conversion constant; a memory unit that stores a pattern-conversion constant that corresponds to the third conversion constant; a second-signal-generation unit that generates a second signal that contains the second substitute value, second conversion constant and the pattern-conversion constant; and a transmission unit that sends the first signal and second signal to the apparatus on the receiving side; and the apparatus on the receiving side comprises: a reading unit that receives the first signal and second signal and reads the first substitute vale and first conversion constant from the first signal, and reads the second substitute value, second conversion constant and the pattern-conversion constant from the second signal; a memory unit that stores the third conversion constant that corresponds to the read pattern-conversion constant; a reading unit that reads the third conversion constant from the read pattern-conversion constant; a decoding unit that uses the conversion constants that were used to encrypt the first substitute value and second substitute value to decode the first substitute value and second substitute value to first decoded data and second decoded data, respectively; and an authentication unit that authenticates the first signal and second signal from the first decoded data and second decoded data.

In this way, with this invention, there is no relay apparatus, and the apparatus on the receiving side is constructed such that it performs the process that was performed by the relay apparatus of converting the pattern-conversion constant to a conversion constant. By doing this, together with being able to eliminate problems due to fraudulent transmission without decreasing the confidentiality of the data, it is possible to simplify the construction of the system.

Also, the encryption unit can be constructed such that it uses the second conversion constant and third conversion constant to encrypt the transmission data to the first substitute value, and uses the first conversion constant and third conversion constant to encrypt the transmission data to the second substitute value.

Moreover, the encryption unit can be constructed such that it uses the second conversion constant to encrypt the transmission data to the first substitute value, and uses the first conversion constant and third conversion constant to encrypt the transmission data to the second substitute value.

Also, by having the encryption unit use the second conversion constant and third conversion constant to encrypt the transmission data to the first substitute value, and use the first conversion constant to encrypt the transmission data to the second substitute value, the decoded data that are obtained by decoding each of the signals will not match even when the two signals are sent to the apparatus on the receiving side by fraudulent transmission, so the effect of eliminating fraudulent transmission is improved, and is desirable.

Moreover, by having the apparatus on the receiving side comprise a drive-signal-transmission unit that sends a drive signal for driving an external-drive apparatus based on the first decoded data or second decoded data, and by taking advantage of the confidentiality of the data and the effect of eliminating fraudulent transmission of this system, it is possible to authenticate the operator or received signal and to operate the external-drive apparatus, which is desirable.

Furthermore, it is possible to construct the authentication unit such that it performs authentication when the first decoded data and second decoded data match. Also, the system can be constructed such that the apparatus on the sending side, the relay apparatus and the apparatus on the receiving side are connected to a communications network that includes the Internet. Moreover, the apparatus on the sending side and the apparatus on the receiving side can send or receive signals using an infrared method, wireless method, optical communication method, or wired communication method.

Also, the data-transmission method of this invention is a data-transmission method that sends transmission data, which has been encrypted using at least one conversion constant from among a first conversion constant, second conversion constant and third conversion constant, from an apparatus on the sending side to an apparatus on the receiving side, wherein the apparatus on the sending side comprises: a step of selecting the first conversion constant, second conversion constant and third conversion constant; an encryption step of using the second conversion constant, or the second conversion constant and third conversion constant to encrypt the transmission data to a first substitute value, and using the first conversion constant, or the first conversion constant and third conversion constant to encrypt the transmission data to a second substitute value; a first-signal-generation step of generating a first signal that contains the first substitute value and the first conversion constant; a second-signal-generation step of generating a second signal that contains the second substitute value, the second conversion constant and a pattern-conversion constant that corresponds to the third conversion constant; and a first transmission step of sending the first signal to the apparatus on the receiving side and the second signal to a relay apparatus; the relay apparatus comprises: a conversion step that receives the second signal and converts the pattern-conversion constant contained in the second signal to the corresponding third conversion constant to generate a second' signal; and a second transmission step of sending the second' signal to the apparatus on the receiving side; and the apparatus on the receiving side comprises: a reading step of receiving the first signal from the apparatus on the sending side and the second' signal from the relay apparatus, and reading the first substitute value and the first conversion constant from the first signal, and reading the second substitute value, the second conversion constant and the third conversion constant from the second' signal; a decoding step of using the conversion constants that were used in encrypting the first substitute value and the second substitute value and decoding the first substitute value and the second substitute value to first decoded data and second decoded data, respectively; and an authentication step of authenticating the first signal and the second' signal from the first decoded data and the second decoded data.

Also, the data-transmission method of this invention is a data-transmission method that sends transmission data, which has been encrypted using two conversion constants from among a first conversion constant, second conversion constant, third conversion constant and fourth conversion constant, from an apparatus on the sending side to an apparatus on the receiving side, wherein the apparatus on the sending side comprises: a selection step of selecting the first conversion constant, second conversion constant, third conversion constant and fourth conversion constant; an encryption step of using the second conversion constant and fourth conversion constant to encrypt the transmission data to a first substitute value, and using the first conversion constant and third conversion constant to encrypt the transmission data to a second substitute value; a first-signal-generation step of generating a first signal that contains the first substitute value, first conversion constant, and pattern-conversion constant that corresponds to the third conversion constant or fourth conversion constant; a second-signal-generation step of generating a second signal that contains the second substitute value, second conversion constant, and pattern-conversion constant that corresponds to the third conversion constant or fourth conversion constant that is not contained in the first signal; and a first transmission step of sending the first signal to a first relay apparatus, and sending the second signal to a second relay apparatus; the first relay apparatus and second relay apparatus comprise: a conversion step of receiving the first signal or second signal and converting the pattern-conversion constant contained in that signal to the corresponding third conversion constant or fourth conversion constant to generate a first' signal or second' signal; and a second transmission step of sending the first' signal or second' signal to the apparatus on the receiving side; and the apparatus on the receiving side comprises: a reading step of receiving the first' signal and second' signal, and reading the first substitute value, first conversion constant and third conversion constant or fourth conversion constant from the first' signal, and reading the second substitute value, second conversion constant and third or fourth conversion constant from the second' signal; a decoding step of using the conversion constants that were used in encrypting the first substitute value and second substitute value to decode the first substitute value and second substitute value to first decoded data and second decoded data, respectively; and an authentication step of authenticating the first' signal and second' signal from the first decoded data and second decoded data.

Also, the data-transmission method of this invention is a data-transmission method that sends transmission data, which has been encrypted using at least one conversion constant from among a first conversion constant, second conversion constant and third conversion constant, from an apparatus on the sending side to an apparatus on the receiving side, wherein the apparatus on the sending side comprises: a step of selecting the first conversion constant, second conversion constant and third conversion constant; an encryption step of using the second conversion constant or the second conversion constant and third conversion constant to encrypt the transmission data to a first substitute value, and using the first conversion constant or the first conversion constant and third conversion constant to encrypt the transmission data to a second substitute value; a first-signal-generation step of generating a first signal that contains the first substitute value and first conversion constant; a second-signal-generation step of generating a second signal that contains the second substitute value, second conversion constant and pattern-conversion constant that corresponds to the third conversion constant; and a transmission step of sending the first signal and second signal to the apparatus on the receiving side; and the apparatus on the receiving side comprises: a reading step of receiving the first signal and second signal and reading the first substitute value and first conversion constant from the first signal, and reading the second substitute value, second conversion constant and the pattern-conversion constant from the second signal; a conversion-constant-acquisition step of acquiring the third conversion constant that corresponds to the read pattern-conversion constant; a decoding step of using the conversion constants that were used to encrypt the first substitute value and second substitute value to decode the first substitute value and second substitute value to first decoded data and second decoded data, respectively; and an authentication step of authenticating the first signal and second signal from the first decoded data and second decoded data.

In the encryption step it is possible to use the second conversion and third conversion constant to encrypt the transmission data to a first substitute value, and to use the first conversion constant and third conversion constant to encrypt the transmission data to a second substitute value.

Also, in the encryption step, it is possible to use the second conversion constant to encrypt the transmission data to a first substitute value, and to use the first conversion constant and third conversion constant to encrypt the transmission data to a second substitute value.

Moreover, in the encryption step it is possible to use the second conversion constant and third conversion constant to encrypt the transmission data to a first substitute value, and to use the first conversion constant to encrypt the transmission data to a second substitute value.

Also, after the authentication step, it is preferable for the apparatus on the receiving side to further comprise a drive-signal-transmission step of sending a drive signal for driving an external-drive apparatus based the first decoded data or second decoded data.

Moreover, the authentication step can be such that it performs authentication when the first decoded data matches the second decoded data.

Also, this invention is an apparatus that sends data that has been encrypted using at least a first one conversion constant from among a first conversion constant, second conversion constant and third conversion constant and comprises: a memory unit that stores pattern-conversion constants that correspond to the conversion constants; a control unit, which performs a conversion-constant-selection process of selecting the first conversion constant, second conversion constant and third conversion constant, an encryption process of using the second conversion constant, or second conversion constant and third conversion constant to encrypt the transmission data to a first substitute value, and uses the first conversion constant, or first conversion constant and third conversion constant to encrypt the transmission data to a second substitute value, a first-signal-generation process of generating a first signal that contains the first substitute value and first conversion constant, a second-signal-generation process of generating a second signal that contains the second substitute value, second conversion constant and pattern-conversion constant that corresponds to the third conversion constant, and a process of sending the first signal and second signal; and a transmission unit that sends the first signal and second signal to the outside.

Also, the control unit can be constructed such that it uses the second conversion constant and third conversion constant to encrypt the transmission data to a first substitute value, and uses the first conversion constant and third conversion constant to encrypt the transmission data to a second substitute value.

Moreover, the control unit can be constructed such that it uses the second conversion constant to encrypt the transmission data to a first substitute value, and uses the first conversion constant and third conversion constant to encrypt the transmission data to a second substitute value.

Furthermore, the control unit can be constructed such that it uses the second conversion constant and third conversion constant to encrypt the transmission data to a first substitute value, and uses the first conversion constant to encrypt the transmission data to a second substitute value.

Also, this invention is an apparatus that sends data that has been encrypted using two conversion constants from among a first conversion constant, second conversion constant, third conversion constant and fourth conversion constant, and comprises: a memory unit that stores pattern-conversion constants that correspond to the conversion constants; a control unit, which performs a conversion-constant-selection process of selecting the first conversion constant, second conversion constant, third conversion constant and fourth conversion constant, an encryption process of using the second conversion constant and fourth conversion constant to encrypt the transmission data to a first substitute value, and uses the first conversion constant and third conversion constant to encrypt the transmission data to a second substitute value, a first-signal-generation process of generating a first signal that contains the first substitute value, first conversion constant and pattern-conversion constant that corresponds to the third conversion constant or fourth conversion constant, and a second-signal-generation process of generating a second signal that contains the second substitute value, second conversion constant and pattern-conversion constant that corresponds to the third conversion constant or fourth conversion constant that is not contained in the first signal; and a transmission unit that sends the first signal and second signal to the outside.

Moreover, this invention is an apparatus that transfers a signal that contains pattern-conversion constants corresponding to the conversion constants that are used in encrypting the transmission data, and comprises: a memory unit that stores pattern-conversion constants that correspond to the conversion constants; a transmission/reception unit that sends and receives the signal; and a control unit that performs a signal-generation process of converting the pattern-conversion constants contained in the received signal to the conversion constants to convert that signal, and a process of transferring the converted signal.

Furthermore, this invention is an apparatus that receives a first signal and second' signal that contain transmission data that was encrypted using at least one conversion constant from among a first conversion constant, second conversion constant and third conversion constant, and decodes the transmission data, and comprises: a receiving unit that receives the first signal and second' signal, wherein the first signal contains a first substitute value, which is the transmission data that has been encrypted using the second conversion constant, or the second conversion constant and third conversion constant, and the first conversion constant, and the second' signal contains, a second substitute value, which is the transmission data that has been encrypted using the first conversion constant, or the first conversion constant and the third conversion constant, the second conversion constant and third conversion constant; and a control unit that performs a process of reading the first substitute value and first conversion constant from the first signal, and reading the second substitute value, second conversion constant and third conversion constant from the second' signal; a decoding process of using the conversion constants that were used for encrypting the first substitute value and second substitute value to decode the first substitute value and second substitute value to first decoded data and second decoded data, respectively; and an authentication process of authenticating the first signal and second' signal from the first decoded data and second decoded data.

Also, this invention is an apparatus that receives a first' signal and a second' signal, which contain transmission data that has been encrypted using two conversion constants from among a first conversion constant, second conversion constant, third conversion constant and fourth conversion constant, and decodes the transmission data, and comprises: a reception unit that receives the first' signal and second' signal wherein the first signal' contains a first substitute value, which is the transmission data that has been encrypted using the second conversion constant and fourth conversion constant, the first conversion constant and third conversion constant or fourth conversion constant, and the second' signal contains a second substitute value, which is the transmission data that has been encrypted using the first conversion constant and the third conversion constant, the second conversion constant and third conversion constant or fourth conversion constant that is not contained in the first' signal; and a control unit that performs: a reading process of reading the first substitute value, first conversion constant and third conversion constant or fourth conversion constant from the received first' signal, and reading the second substitute value, second conversion constant and third conversion constant or fourth conversion constant from the received second' signal; a decoding process of using the conversion constants that were used to encrypt the first substitute value and second substitute value to decode the first substitute value and second substitute value to first decoded data and second decoded data, respectively; and an authentication process of authenticating the first' signal and second' signal from the first decoded data and second decoded data.

Moreover, this invention is an apparatus that receives a first signal and a second signal that contains transmission data that has been encrypted using at least one conversion constant from among a first conversion constant, second conversion constant and third conversion constant, and decodes that transmission data, and comprises: a memory unit that stores pattern-conversion constants that correspond to the conversion constants; a reception unit that receives the first signal and second signal, wherein the first signal contains a first substitute value that was encrypted using the second conversion constant or the second conversion constant and third conversion constant, and the first conversion constant, and the second signal contains a second substitute value that was encrypted using the first conversion constant of the first conversion constant and third conversion constant, the second conversion constant, and a pattern-conversion constant that corresponds to the third conversion constant; and a control unit that performs: a reading process of reading the first substitute value and first conversion constant from the first signal, and reading the second substitute value, second conversion constant and pattern-conversion constant from the second signal; an acquisition process of acquiring the third conversion constant from the read pattern-conversion constant; a decoding process of using the conversion constants that were used to encrypt the first substitute value and second substitute value to decode the first substitute value and second substitute value to first decoded data and second decoded data; and an authentication process of authenticating the first signal and second signal from the first decoded data and second decoded data.

Also, the control unit can be constructed such that it sends a drive signal for driving an external-drive apparatus based on the first decoded data or second decoded data.

Moreover, the control unit can be constructed such that it performs authentication when the first decoded data and second decoded data match.

BRIEF DESCRIPTION OF THE DRAWINGS

FIG. 4 is a schematic drawing of the data-transmission/reception apparatus of an embodiment of the invention.

FIG. 5 is a drawing explaining the encryption of transmission data of an embodiment of the invention.

FIG. 6 is a drawing explaining the configuration of a first signal of an embodiment of the invention.

FIG. 7 is a drawing explaining the configuration of a second signal of an embodiment of the invention.

FIG. 10 is a drawing explaining the configuration of a second signal' of an embodiment of the invention.

FIG. 11 is a drawing explaining decoding of the transmission signal of an embodiment of the invention.

FIG. 12 is a drawing showing an example of data for explaining decoding of transmission signal of an embodiment of the invention.

DESCRIPTION OF THE PREFERRED EMBODIMENTS

The preferred embodiments of the invention will be explained below with reference to the drawings. The present invention is not limited by the arrangements, forms and the like explained below, and of course the embodiments could be changed within the scope of the invention.

Figure 1:
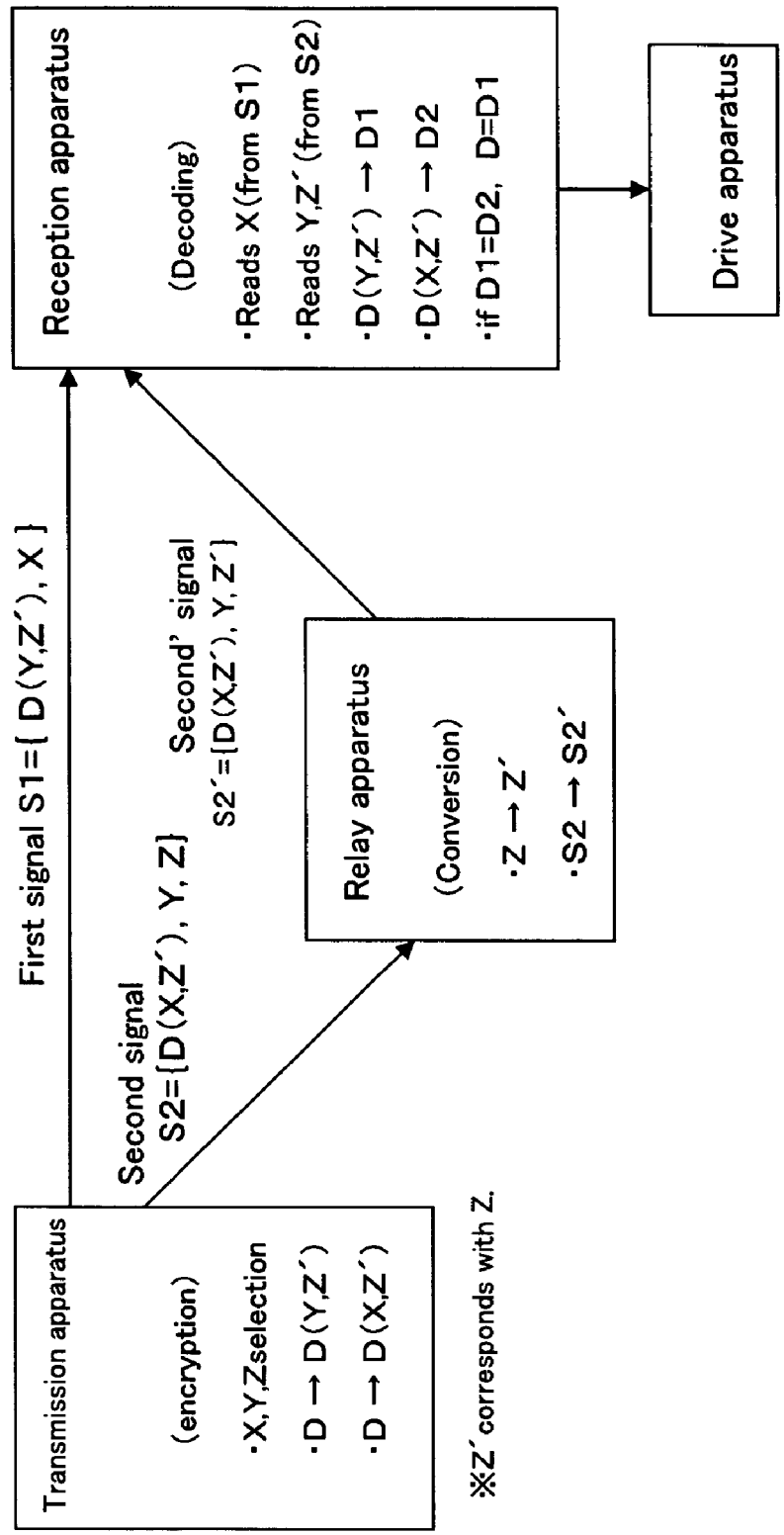
FIG. 1 is a drawing explaining a first data-transmission method.

A first data-transmission method related to the data-transmission system of the invention will be explained based on FIG. 1. In this data-transmission method, a first signal S1 and second signal S2 are sent by separate routes to the recipient (apparatus on the receiving side) from the sender (apparatus on the sending side). Transmission referred to in this invention includes transmission over wired lines or wireless lines (for example, transmission using infrared communication, radio waves, optical communication, etc.) and data transmission by a transmission means (such as mail delivery or the like).

First, the apparatus on the sending side selects conversion constants X, Y and a pattern-conversion constant Z, which will be used as the encryption key. A conversion constant Z' that is associated with the pattern-conversion constant Z is registered in the apparatus on the sending side and relay apparatus. When a pattern-conversion constant Z is selected, the apparatus on the sending side and relay apparatus read the conversion constant Z' that corresponds to it.

The apparatus on the sending side encrypts the transmission data D into encrypted data D(Y,Z') using a combination of the conversion constants Y and Z', and encrypted data D(X,Z') using a combination of the conversion constants X and Z'. The first signal S1 contains the encrypted data D(Y,Z') and conversion constant X, and the second signal S2 contains encrypted data D(X,Z'), conversion constant Y and pattern-conversion constant Z.

The first signal S1 is sent to the apparatus on the receiving side. On the other hand, the second signal S2 is sent temporarily to the relay apparatus. Also, the second signal S2 is converted by the relay apparatus to second' signal S2'. In other words, the relay apparatus converts the pattern-conversion constant Z that is contained in the received second signal S2 to conversion constant T. Moreover, the second' signal S2' is sent from the relay apparatus to the apparatus on the receiving side. The first signal S1 and second signal S2 can also be sent from the apparatus on the sending side such that there is time between.

The apparatus on the receiving side receives the first signal S1 and second' signal S2', and reads the conversion constant X from the first signal S1, and the conversion constants Y and Z' from the second' signal S2'. Also, the encrypted data D(Y,Z') that is contained in the first signal S1 is decoded by a combination of the read conversion constants Y and Z', to calculate the decoded data D1. On the other hand, the encrypted data D(X,Z') that is contained in the second' signal S2' is decoded by a combination of the read conversion constants X and Z', to calculate the decoded data D2.

The decoded data D1 is then compared with the decoded data D2. When both match on the receiving side, the decoded data D1 (or D2) is used as the transmission data D. It is also possible for the transmission data D to include drive signals for driving various external-drive apparatuses that are connected to the reception apparatus. For example, it is possible to perform the opening/closing operation for a lock system as the external-drive apparatus.

In the encryption example above, transmission data D was encrypted using a combination of conversion constants Y and Z' and a combination of conversion constants X and Z', however, the invention is not limited to this, and it is also possible to encrypt the transmission data D using just a combination of conversion constants Y and Z' (D(Y,Z')) and conversion constant X (D(X)). In this case, the first signal S1 contains the encrypted data D(Y,Z') and conversion constant X, and the second signal S2 contains the encrypted data D(X), conversion constant Y and pattern-conversion constant Z.

Also, it is possible for the transmission data D to be encrypted using just conversion constant Y (D(Y)) and conversion constants X and Z' (D(X,Z')), and such that the first signal S1 contains encrypted data D(Y) and conversion constant X, and the second signal S2 contains encrypted data D(X,Z'), conversion constant Y and pattern-conversion constant Z.

By doing this, even when there is a fraudulent transmission, the relay apparatus converts the pattern-conversion constant Z contained in the fraudulent second signal S2 to conversion constant Z' using the registered correspondence. Also, the second' signal S2' that contains this improper correspondence is transferred to the receiving side.

However, since this conversion constant Z' is different than the conversion constant used for encryption of the fraudulent transmission, when decoding is performed by the receiving side based on the fraudulent first signal S1 and the fraudulent second' signal S2', the obtained decoded data D1 and D2 do not match. Also, the decoded data cannot be decoded as meaningful data.

When sending encrypted transmission data by two systems using the first data-transmission method as described above, the encryption key (conversion constant Y) for the encrypted data contained in the first signal S1 is contained and sent in the second signal S2, and the encryption key (conversion constant X) for the encrypted data contained in the second signal S2 is contained and sent in the first signal S1

Furthermore, the common encryption key (conversion constant Z') for encrypted data contained in both the first signal S1 and second signal S2 is not sent itself, rather a pattern-conversion constant Z that corresponds to the encryption key is included in the second signal S2 and sent to the relay apparatus. By converting this pattern-conversion constant Z to a conversion constant Z', the relay apparatus converts the second signal S2 to a second' signal S2', and transfers it to the receiving side.

By performing transmission in this way, even though a third party obtains both the first signal S1 and second signal S2, the pattern-conversion constant Z is unknown so it is not possible to decode the transmission data D. Also, even though a third party may obtain either the first signal S1 or second' signal S2', neither signal contains all of the conversion constants, so it is not possible to decode the data.

Moreover, even though a third party may obtain both the first signal S1 and the second' signal S2', it is not possible to obtain meaningful decoded data without also obtaining the decoding method.

As described above, in the first data-transmission method, even though a third party may obtain encrypted data improperly, it is not possible to perform meaningful decoding of the encrypted data, therefore confidentiality of the transmission data is improved.

Also, on the receiving side, it is possible to decode the encrypted data without knowing the pattern-conversion constant that is registered on the sending side. Therefore, by registering combinations of a plurality of pattern-conversion constants Z and conversion constants Z' on the sending side, it is possible to improve confidentiality even when sending encrypted data to a plurality of recipients (apparatuses on the receiving side).

Moreover, since the encryption method and pattern-conversion constant using the conversion constants X, Y and Z' are unknown to a third party, it is not possible to decode meaningful data on the receiving side even though data may be sent by a third party posing as the sender. Also, the decoded data do not match. In this way, it is possible to avoid problems due to fraudulent transmission.

Figure 2:
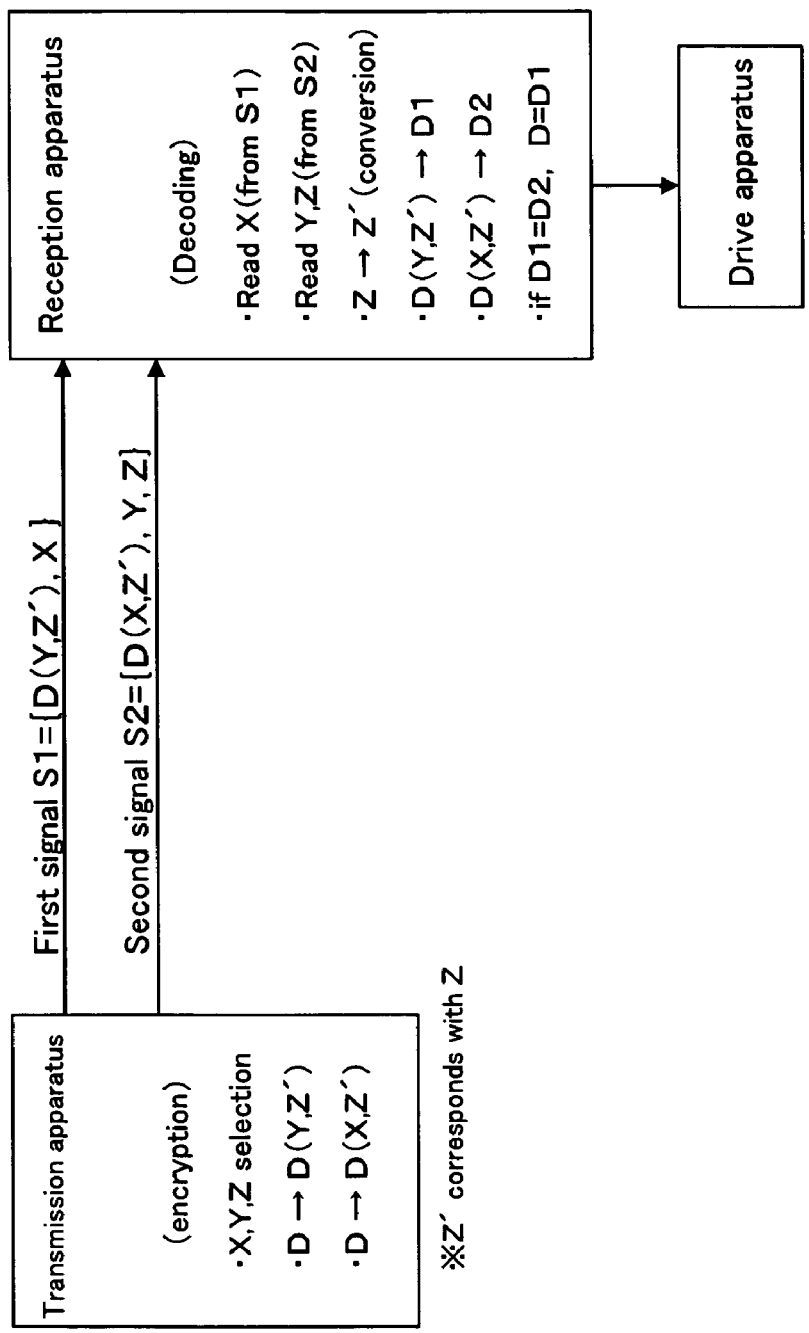
FIG. 2 is a drawing explaining a second data-transmission method.

Next, FIG. 2 will be used to explain a second data-transmission method. Transmission of a first signal S1 and second signal S2 from the sender (apparatus on the sending side) to a recipient (apparatus on the receiving side) using separate routes is the same as in the first data-transmission method. Also, the encryption method for the first signal S1 and second signal S2 that are sent from the apparatus on the sending side and the conversion constants contained in each are the same.

The difference between the second data-transmission method and the first data-transmission method described above is that the second signal S2 is not sent via a relay apparatus. Therefore, in the first data-transmission method a pattern-conversion constant Z and conversion constant Z' were registered both on the sending side and in the relay apparatus, however, in the second data-transmission method the pattern-conversion constant Z and conversion constant Z' are registered on the sending side and the receiving side.

Therefore, the apparatus on the receiving side receives the first signal S1 and second signal S2, and then reads the conversion constant X from the first signal S1, and reads the conversion constant Y and pattern-conversion constant Z from the second signal S2. Also, the apparatus on the receiving side reads the conversion constant Z' that corresponds to the read pattern-conversion constant Z.

By doing this, the encrypted data D(Y,Z') (or D(Y)) that is contained in the first signal S1 is decoded into decoded data D1 using a combination of the conversion constants Y and Z' (or Y only), and the encrypted data D(X,Z') (or D(X)) that is contained in the second signal S2 is decoded into decoded data D2 using a combination of the conversion constants X and Z' (or X only).

Or, the encrypted data D(Y,Z') (or D(Y)) that is contained in the first signal S1 is decoded into decoded data D1 using a combination of the conversion constants Y and Z' (or Y), and the encrypted data D(X) (or D(X,Z')) that is contained in the second signal S2 is decoded into decoded data D2 using conversion constant X (or a combination of X and Z').

Also, as in the first data-transmission method, when both decoded data match on the receiving side, the decoded data D1 (or D2) can be used as the transmission data D.

As described above, when sending transmission data, which has been encrypted using the second data-transmission method, over two transmission lines, the encryption key (conversion constant Y) for the encrypted data contained in the first signal S1 is contained and sent in the second signal S2, and the encryption key (conversion constant X) for the encrypted data contained in the second signal S2 is contained and sent in the first signal S1. This is the same as in the first data-transmission method.

Also, the common encryption key (conversion constant Z') for encrypted data contained in both the first signal S1 and second signal S2 is not sent itself, rather a pattern-conversion constant Z that corresponds to that encryption key is contained and sent in the second signal S2.

Moreover, the apparatus on the receiving side that received the second signal S2 references the registered data of combinations of existing pattern-conversion constants Z and conversion constants Z', and reads the conversion constant Z' based on the pattern-conversion constant Z contained in the second signal S2, and further uses the conversion constants X, Y obtained from the first signal S1 and second signal S2 to decode the transmission data D.

In this way, by registering pattern-conversion constants beforehand on the sending side and receiving side, it becomes possible to send confidential data directly between the sending side and the receiving side. Using this kind of transmission method, it is possible to perform operations such as the opening/closing operation of a door lock as an external-drive apparatus. Difficulty in decoding leaked data, and being able to avoid problems due to fraudulent transmission is the same as in the first data-transmission method.

In the first and second transmission methods, encryption was performed using the three encryption keys, conversion constants X, Y and Z, however, the concept of conversion constants X, Y and Z is a concept that includes a plurality of conversion constants X1, X2, . . . , Y1, Y2, . . . , and Z1, Z2, . . . , respectively. Also, for example, when a plurality of conversion constants (X1, X2, . . . ) is used for conversion constant X, this plurality of conversion constants can be placed in the first signal S1 or second signal S2, or can be divided among both.

Figure 3:
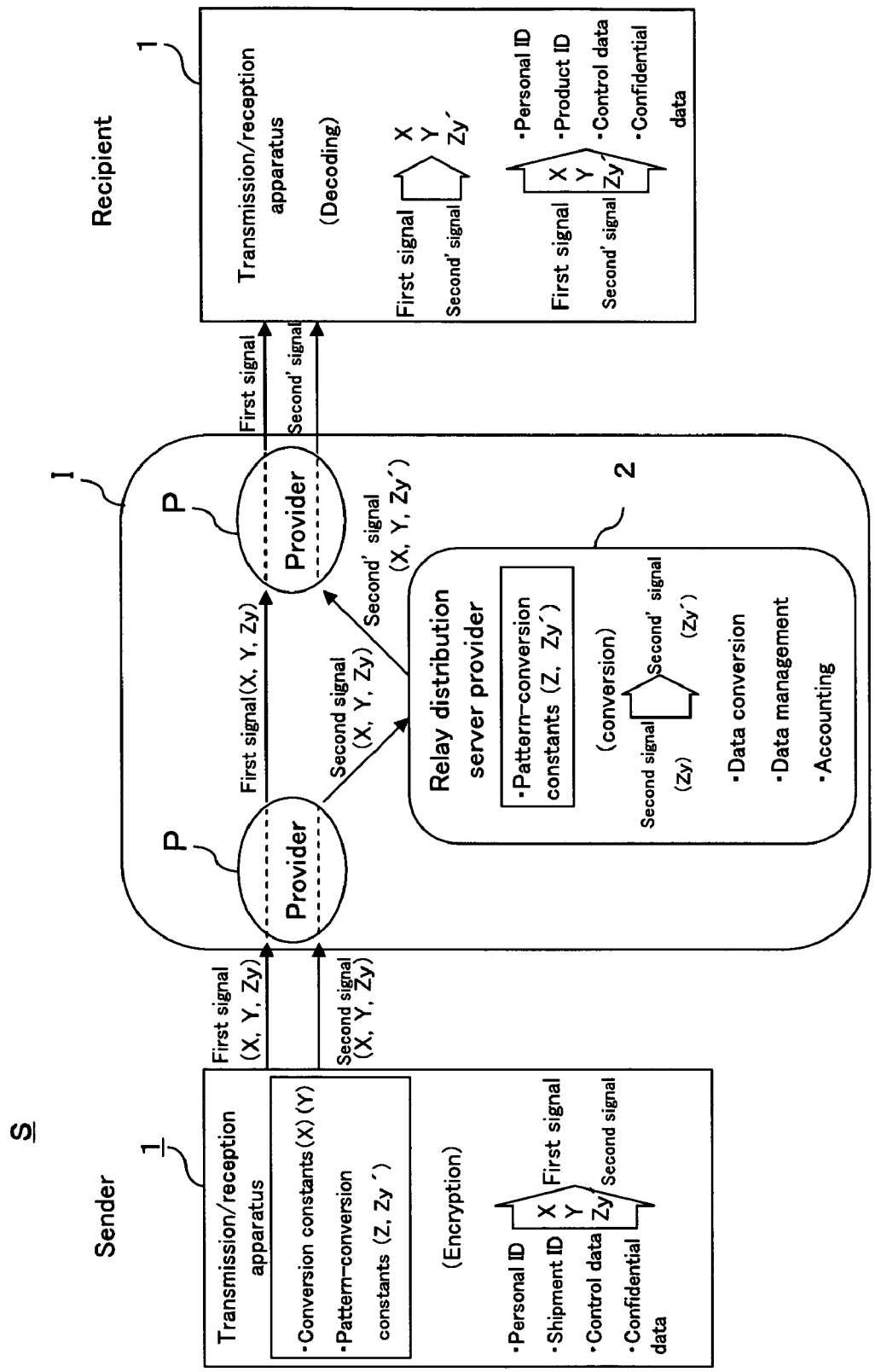
FIG. 3 is a drawing explaining the data-transmission system of an embodiment of the invention.

Next, FIG. 3 will be used to explain an embodiment that uses the first transmission method. The data-transmission system S of this embodiment is a system in which encrypted transmission data is sent from one transmission/reception apparatus 1 (hereafter referred to as apparatus 1) to another transmission/reception apparatus 1 via the Internet I.

The first signal S1 is sent from the apparatus 1 on the sending side to the address of the apparatus 1 on the receiving side via a provider P, and the apparatus 1 on the receiving side receives that first signal S1. Also, the second signal S2 is sent from the apparatus 1 on the sending side to the relay-distribution-server provider 2 (hereafter referred to as the relay apparatus 2) via the provider P. The relay apparatus 2 converts the second signal S2 to a second' signal S2', and then sends that signal to the address of the apparatus 1 on the receiving side. The apparatus 1 on the receiving side receives the second' signal S2'.

In the data-transmission system S of this embodiment, a personal authentication number A, shipment authentication number B, control data C and confidential data Dt are sent as the transmission data. The personal authentication number A, shipment authentication number B and control data C are encrypted using conversion constants X, Y and Zy' as the first to third conversion constants, and are contained in the first signal S1 and second signal S2. Also, the confidential data Dt is separately kept confidential and is contained in the first signal S1.

The apparatus 1 on the receiving side receives the first signal S1 and second' signal S2', and reads the conversion constants X, Y and Zy' from both signals, and using these decodes the data related to the encrypted personal authentication number A, shipment authentication number B and control data C contained in both signals, and decodes the confidential data Dt. Furthermore, it drives an external device based on the encrypted control data C.

The conversion constants X, Y of this embodiment are generated in apparatus 1 using random numbers. Therefore, different conversion constants are selected for each transmission. Also, the apparatus 1 on the sending side has unique pattern-conversion-constant data, and a plurality of combinations (26 combinations in this embodiment) of pattern-conversion constants Zy and conversion constants Zy' are registered by the sender as pattern-conversion-constant data. This pattern-conversion-constant data is also correlated with each sender and registered in the relay apparatus 2.

The senders registered in this system S have a unique personal authentication number A, and using the apparatus 1 can send a personal authentication number A, shipment authentication number B, control data C and confidential data Dt. The recipient receives the two signals sent from the sender, and from these uses apparatus 1 to perform authentication of the transmission data, and is able to obtain the personal authentication number A, shipment authentication number B, control data C and confidential data Dt.

The shipment authentication number B is used by the sender to send a shipment authentication number of a product to the recipient, and can be used in applications such as a distribution means for delivering products from a seller to a buyer, as a delivery locker or the like. Also, it can be used when sending credit card numbers.

The control data C is for sending a control number such as a selling price, frequency of use, barcode output, remote-control ON/OFF signals, lock/unlock signals for a lock, etc.

The confidential data Dt is used by a sender to enclose and send an estimate, medical record, legal document, report card or other confidential document to a recipient. The confidential data Dt is separately kept confidential and is contained in the first signal S1.

As described above, pattern-conversion-constant data for each of a plurality of registered senders is stored in the relay apparatus 2, and it receives a second signal S2 from a registered sender and converts the pattern-conversion constants in that signal to corresponding conversion constants to generate a second' signal S2', and transfers that signal to the address of the recipient that was attached to the second signal S2.

Also, together with performing processing such as data management, data conversion and data transfer, the relay apparatus 2 performs processing to create account data for performing accounting based on processing such as data transfer. By doing this, it is possible to bill registered senders for use fees according to their usage. It is feasible for this kind of accounting to be performed according to amount of usage, quantity of data, etc.

Next, FIG. 4 will be used to explain the construction of the apparatus 1 and relay apparatus 2. The apparatus 1 can be constructed as a special apparatus, or it can be constructed using a normal desktop personal computer or mobile terminal. The apparatus 1 comprises: a CPU 100 as a control unit, an input/output unit 101 for input or output of data, a display unit 102 for displaying data, a transmission unit 103 and a memory unit 110 in which various data are stored.

The CPU 100 performs controls such as input/output control of data, data-transmission control, encryption and decoding of data, reading of data, creation of the first signal and second signal, authentication processing, and control of an external-drive apparatus. In the case of the data encryption process, the CPU 100 automatically selects conversion constants using random numbers (conversion-constant-selection process), and performs encryption of input data (encryption process) using those conversion constants according to a specified encryption method. It is also possible for the sender to specify the conversion constants and have the CPU 100 select those conversion constants.

The input/output unit 101 is used for inputting personal authentication numbers A, shipment authentication numbers B, and the recipient's address as transmission data, registering pattern-conversion-constant data, encrypting or decoding data, reading barcodes etc.; and it comprises data-input/output apparatuses such as a keyboard, mouse, barcode reader and various memory media.

The display unit 102 displays the input/output data, and comprises, for example, an LCD apparatus or the like. The transmission unit 103 is connected to the Internet 1 and external-drive apparatus, and is used for sending data to or receiving data from the outside; for example it could be a modem or LAN card.

The memory unit 110 comprises a main memory 111, ROM 112 and RAM 113. The main memory unit 111 stores the operating-system program, various application programs, including a program for sending or receiving data, and the pattern-conversion-constant data 111a. Also, the ROM 112 stores basic programs, and RAM 113 is used as a work area.

When sending data, the sender activates the control program for the data-transmission system S, and performs operation for inputting specified data from the input/output unit 101 and other transmission operations. Also, the recipient receives the signals and performs the decoding operation, etc.

The relay apparatus 2 of this embodiment can be realized as a server computer of a provider. The relay apparatus 2 comprises: a CPU 200 as the control unit, an input/output unit 201, display unit 202, transmission unit 203 and memory unit 210. The memory unit 210 comprises: a main memory unit 221, ROM 212 and RAM 213. The main memory unit 211 stores pattern-conversion-constant data 211a for each of the registered users described above. The CPU 200 performs the signal-transmission process, data-reading process, and signal-conversion process (signal-generation process).

Next, FIG. 5 will be used to explain the encryption of transmission data. As was described above, conversion constants X, Y that are generated using random numbers, and a conversion constant Zy' that corresponds to a pattern-conversion constant Zy selected by the sender are used for encryption in this embodiment. Instead of the sender selecting the pattern-conversion constant Zy, it is also possible to automatically select it at the time of encryption from among registered pattern-conversion-constant data.

As shown in FIG. 5, the personal-authentication number A is encrypted according to a first equation (Ax=A+Y+Zy') and second equation (Ay=A+X+Zy'), the shipment-authentication number B is encrypted according to a first equation (Bx=B+Y+Zy') and second equation (By=B+X+Zy'), and the control data C is encrypted according to a first equation (Cx=C+Y+Zy') and second equation (Cy=C+X+Zy'). Each data is encrypted to a substitute personal ID value (Ax, Ay), substitute shipment ID value (Bx, By) and substitute control data value (Cx, Cy), respectively.

For example, as shown in FIG. 5, when the personal authentication number A is taken to be '123456789012', the shipment authentication number B is taken to be '031234567890', the control data C is taken to be '20000', conversion constant X is taken to be '223344', conversion constant Y is taken to be '445566' and conversion constant Z is taken to be '3399', then each is encrypted according to the respective first equation and second equation such that the personal authentication number A becomes '123457237977, 123457015755', the shipment authentication number B becomes '031235016855, 031234794633', and the control data C becomes '468965, 246743'.

As shown in FIG. 5, the encryption process of this embodiment is performed by adding the conversion constants X and Zy' and conversion constants Y and Zy' to the transmission data, however, it is not limited to this, and it is possible to subtract the conversion constants or perform encryption using some other calculation method. Also, as was described above, it is also possible to perform encryption of the transmission data by using a calculation method that uses conversion constants X and Z' and only conversion constant Y, or that uses only conversion constant X and conversion-constants Y and Z'.

For example, when performing encryption of the transmission data using only conversion constant X and conversion constants Y and Z', the personal authentication number A is encrypted according to a first equation (Ax=A+Y+Zy') and second equation (Ay=A+X), the shipment authentication number B is encrypted according to a first equation (Bx=B+Y+Zy') and second equation (By=B+X), and the control data C is encrypted according to a first equation (Cx=C+Y+Zy') and second equation (Cy=C+X). By doing this, it is possible to improve the effect of eliminating problems due to fraudulent transmission.

Next, FIG. 6 and FIG. 7 will be used to explain the first signal S1 and second signal S2. The first signal S1 and second signal S2 each comprise ten data areas, from packet 1 to packet 10, that specify the size of the respective signal. Packet 0 is an area for temporarily storing a password that is entered when creating the contents for the first signal S1 and second signal S2, and the data it contains is not actually sent.

Packet 1 is a communication number storage area, and contains a number automatically generated for the transmission signal. Packet 2 is an area for storing the address of the sender, and the e-mail address of the sender is entered into it. Packet 3 is an area for storing the registered name of the sender.

Packet 4 is an area for storing conversion constant X in the case of the first signal S1, and conversion constant Y in the case of the second signal S2. Packet 5 is an area for storing the pattern-conversion constant Zy. In the case of this embodiment, the pattern-conversion constant Zy is not entered in the first signal S1, and is entered only in the second signal S2. In the example shown in FIG. 7, 'g' is selected as the pattern-conversion constant Zy. The value 'g' of the pattern-conversion constant Zy corresponds to '3399'.

Packet 6 is an area for storing the substitute personal ID values Ax, Ay that were encrypted from the personal authentication number A using a first equation and second equation, respectively, for both the first signal S1 and second signal S2. Similarly, packet 7 is an area for storing the substitute shipment ID values Bx, By that were encrypted from the shipment authentication number B using a first equation and second equation. Also, packet 8 is an area for storing the substitute control data values Cx, Cy that were encrypted from the control data C using a first equation and second equation.

Packet 9 is an area for storing a control pattern Cp. The control pattern Cp specifies the control pattern for the control data C; for example, when the control pattern Cp is 'a' indicates that the control data C means frequency.

Similarly, when the control pattern Cp is b, c, d or e indicates that the control data C is a money amount such as a prepaid amount or sales amount, numerical data such as a number or barcode output, ON/OFF signal data for remote control, or lock/unlock signal data for a lock system, respectively. In the case of this example, the control pattern Cp is stored only in the first signal S1. In the example shown in FIG. 6, 'b' is selected as the control pattern Cp.

Packet 10 is an area for storing confidential data Dt. In this example, confidential data Dt is stored only in the first signal S1. The first signal S1 and second signal S2 described above can be sent in data file format that is attached to an e-mail. The control pattern Cp and confidential data Dt can also be placed in the second signal S2.

Figure 8:
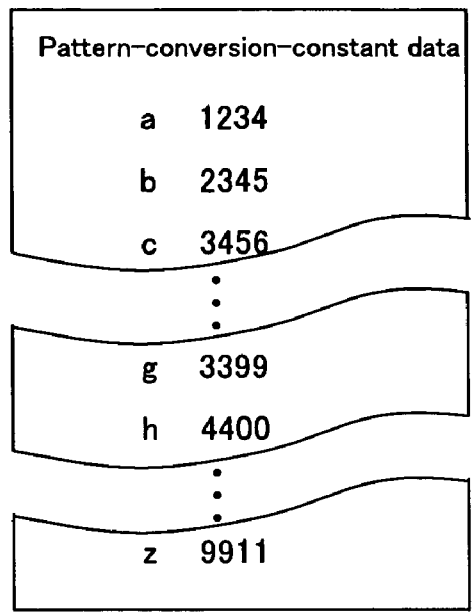
FIG. 8 is a drawing explaining the pattern-conversion-constant data of the transmission apparatus of an embodiment of the invention.

As shown in FIG. 8, the pattern-conversion-constant data 111a that is stored in the apparatus 1 corresponds to the pattern-conversion constants Z (a, b, . . . ), respectively, and is correlated with the conversion constants Zy' (1234, 2345, . . . ), It is possible for a registered sender to specify and register 26 conversion constants Zy' in the apparatus 1. Also, it is possible for the sender to specify and register pattern-conversion-constant data 111a in the relay apparatus 2 directly or by way of the administrator of the data-transmission system S.

Figure 9:
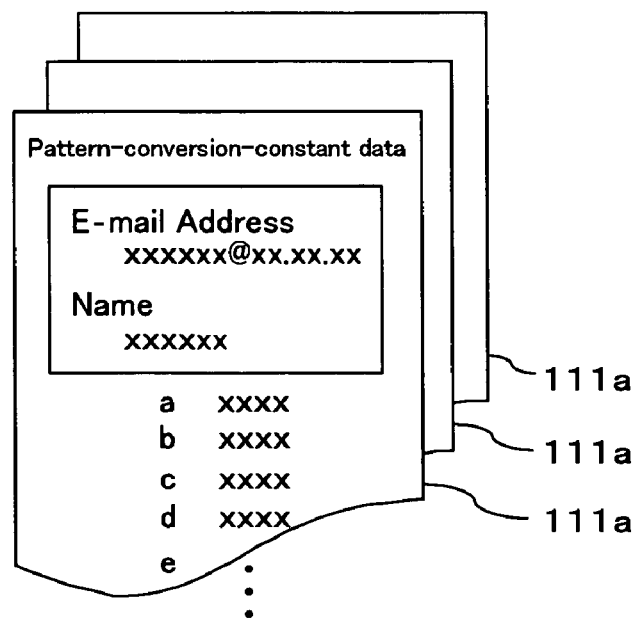
FIG. 9 is a drawing explaining the pattern-conversion-constant data of the relay apparatus of an embodiment of the invention.

As shown in FIG. 9, the pattern-conversion-constant data 211a that is registered in the relay apparatus 2 comprises pattern-conversion-constant data 111a from a plurality of registered senders. The pattern-conversion-constant data 111a for each registered sender is classified according to the e-mail address and registered name of each registered sender.

Next, FIG. 10 will be used to explain the second' signal S2'. The second signal S2 is temporarily sent from the apparatus 1 on the sending side to the relay apparatus 2 via a provider P. The relay apparatus 2 converts the second signal S2 to a second' signal S2' as described above.

The relay apparatus 2 references packet 2 (sender's address) and packet 3 (registered name) in the second signal S2, and selects the pattern-conversion-constant data 111a of the sender from among the pattern-conversion-constant data 211a. Also, it references packet 5 (pattern-conversion constant Zy) in the second signal S2 from the selected pattern-conversion-constant data 111a and identifies the conversion constant Zy' that corresponds to it.

After the conversion constant Zy' has been identified, the relay apparatus 2 generates a second' signal S2' in which packet 5 of the second signal S2 has been converted to the value of the identified pattern-conversion constant Zy'. The relay apparatus 2 converts the received second signal S2 to the second' signal S2' in this way. The relay apparatus 2 then transfers the second' signal S2' to the e-mail address of the recipient that was specified by the sender. In the example shown in FIG. 10, packet 5 of the second' signal S2' (storage area for the pattern-conversion-constant) is converted from 'g' to '3399'.

Next, FIG. 11 will be used to explain the decoding process performed by the apparatus 1 on the receiving side. After the apparatus 1 on the receiving side receives the first signal S1 and second' signal S2', it pairs both signals and temporarily authenticates the signals. When doing this, signals are checked to see whether the communication numbers, sender's address, etc. match. When the results of the this temporary authentication show that the both signals were received from the same sender, then the decoding process for decoding the encrypted data of both signals is performed.

First, in the decoding process the conversion constants X, Y and Zy' from both signals are identified. Next, the first equation (A1=Ax−Y−Zy') and second equation (A2=Ay−Y−Zy') for decoding the substitute personal ID values are used to decode the substitute personal ID value Ax in the first signal S1 and the substitute personal ID value Ay in the second' signal S2'.

Also, the signals are checked whether the registered name of the sender in packet 3 of the first signal S1 and second' signal S2' match, and whether the decoded data (A1, A2) match. When the registered name and decoded data A1 and A2 match, then both signals are finally authenticated.

Similarly, when the first equation for decoding the substitute personal ID value is A1=Ax−Y−Zy', and the second equation is A2=Ay−Y, the substitute personal ID values Ax, Ay are decoded, and decoded data A1 and A2 are calculated, the registered name and decoded data A1 and A2 are compared and when both match, both signals are finally authenticated.

Also, after both signals have finally been authenticated, the first equation (B1=Bx−Y−Zy') and second equation (B2=By−Y−Zy') for decoding the substitute shipment ID values are used to decode the substitute shipment ID value in the first signal S1 and the substitute shipment ID value in the second' signal S2', respectively, and when the decoded data B1 and B2 match, the decoded data B1 (or B2) is adopted as the shipment authentication number B.

Similarly, the first equation (C1=Cx−Y−Zy') and second equation (C2=Cy−Y−Zy') for decoding the substitute control data values are used to decode the substitute control data value Cx in the first signal S1 and the substitute control data value Cy in the second' signal S2', respectively, and when the decoded data C1 and C2 match, the decoded data C1 (or C2) is adopted as the control data C.

This is also the same when the first equation for decoding the substitute shipment ID value is B1=Bx−Y−Zy', and the second equation is B2=By−Y, and when the first equation for decoding the substitute control data value is C1=Cx−Y−Zy', and the second equation is C2=Cy−Y−Zy'.

Also, from the control pattern Cp, the type of control data C is identified. Furthermore, when the type of control data C is ON/OFF signal data or lock/unlock data for an external drive apparatus, the signal is further sent from the apparatus 1 on the receiving side to the external apparatus in order to drive the external drive apparatus.

As shown in FIG. 12, the registered name in both signals is 'xxxxxx', so the registered names (Nm) match, Also, when '123457237977' was received as the substitute personal ID value Ax, and '123457015755' was received as the substitute personal ID value Ay, the conversion constants X, Y and Zy' are read from the specified packet and decoding is performed, and in the case shown in FIG. 12, the decoded data A1 and A2 both become '123456789012', and since both match, both signals are finally authenticated as being legitimate signals.

Also, when the substitute shipment ID values Bx, By were '031235016855' and '031234794633, respectively, the decoded data B1 and B2 both became '031234567890', so both match.

Moreover, when the substitute control data values Cx, Cy were '468965' and '246743', respectively, the decoded data C1 and C2 both became 20000, so both match. From this, '031234567890 and '20000' are adopted as the shipment authentication number B and control data C, respectively.

Figure 13:
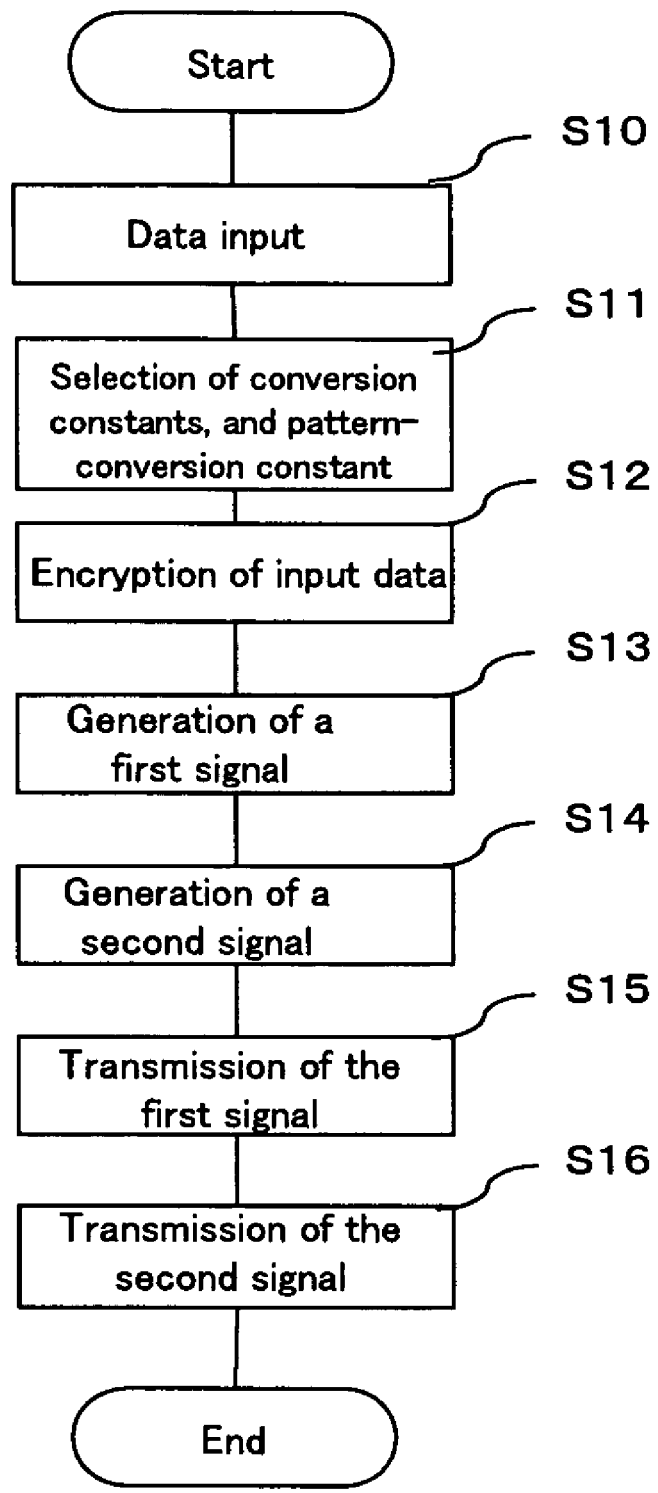
FIG. 13 is a drawing showing the processing flow of the transmission apparatus of an embodiment of the invention.

Next, FIG. 13 will be used to explain the flow of data processing by the apparatus 1 on the receiving side. First, in step S10, specified data that was input by the sender according to the screen display is read. This specified input data includes the e-mail address of the sender (packet 2), sender's name (registered name, packet 3), pattern-conversion constant Zy (packet 5), personal authentication number A, shipment authentication number B, control data C and control pattern Cp (packet 9), confidential data Dt as data related to the first signal S1 and second signal S2, and e-mail address of the recipient and e-mail address of the relay apparatus 2 as other data.

It is also possible to add restrictions by making it necessary to enter a password (packet 0) so that no one other than a registered user can use the apparatus 1 to send data.

Next, in step S11, two random numbers (8 digit in this embodiment) that were selected at the timing that the data was input (S10) are taken to be the conversion constants X, Y, and the conversion constant Zy' that corresponds to the pattern-conversion constant Zy that was input in step S10 is read from the pattern-conversion-constant data 111a.

Also, the process advances to step S12, and the personal authentication number A, shipment authentication number B and control data C that were input in step S10 are encrypted using the conversion constants X, Y, Zy', and the confidential data Dt is encrypted separately. The method for encrypting the confidential data Dt can be such that the confidential data Dt is encrypted using the personal authentication number A, control data C or conversion constant Zy' as the encryption key.

In step S13, based on the data encrypted in step S12 and the input data that was input in step S10, the first signal S1 is generated and by placing each kind of data in a storage area having a specified size.

Next, in step S14, the second signal S2 is generated similar to as was done in step S13. In steps S13 and S14, when there is no data to be placed in packet 5 of the first signal S1, for example, blank data or specified scrambled data is placed in the packet.

Also, for example, in the case where a shipment authentication number B is sent but it is not necessary to send control data C, blank data is input for control data C in step S10. In this case as well, data is generated in step S13 and S14 with blank data (or scrambled data) as the input data.

Moreover, in step S15, based on the transmission input by the sender, first, the first signal S1 is sent to the address of the specified recipient. Next, in step S16, the second signal S2 is sent to the address of the specified relay apparatus 2, and then processing ends.

Figure 14:
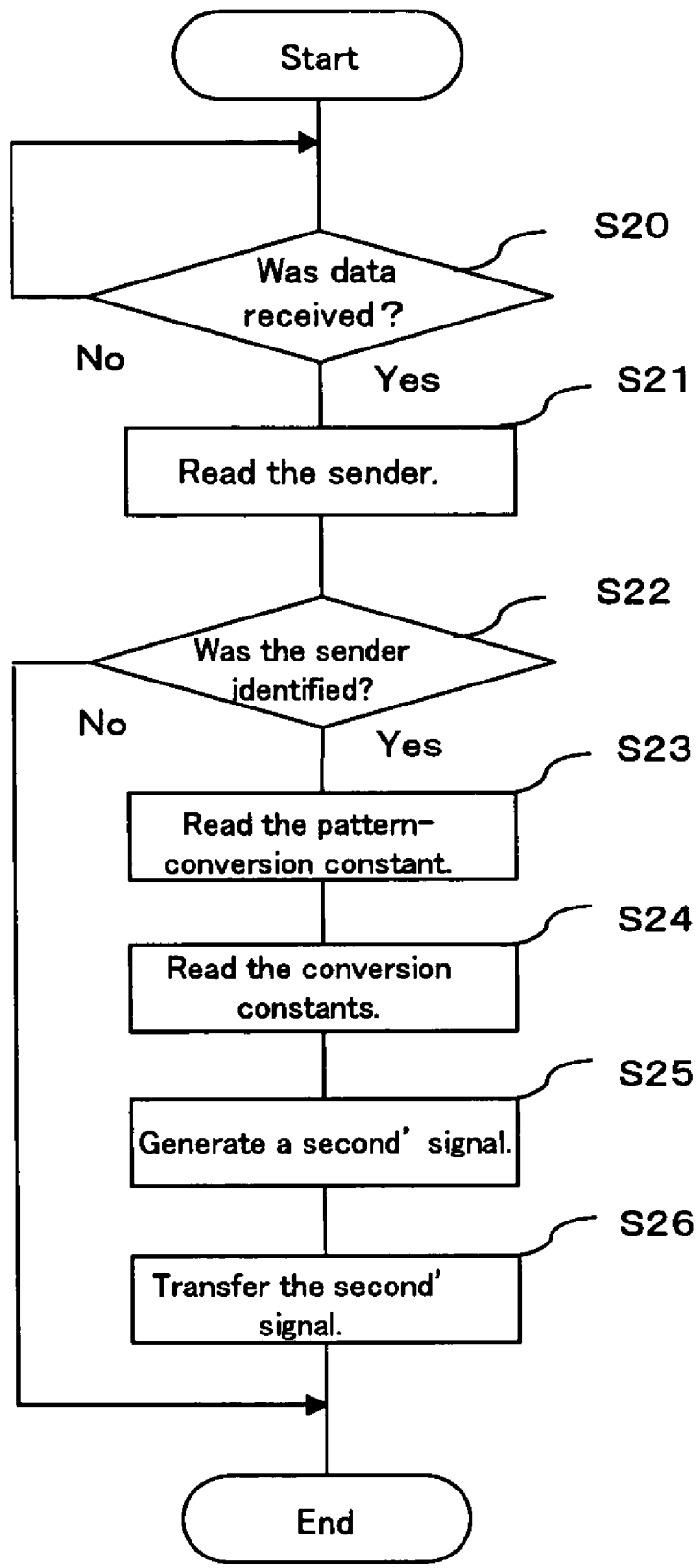
FIG. 14 is a drawing showing the processing flow of the relay apparatus of an embodiment of the invention.

Next, FIG. 14 will be used to explain the flow of processing by the relay apparatus 2. In step 20, the relay apparatus 2 waits for the second signal S2 from the sender to be sent to a specified e-mail address, and in step S20, after the second signal S2 has been received (step S20: Yes), processing advances to step S21 to identify the sender.

In step S21, the relay apparatus 2 reads the e-mail address (packet 2) and registered name (packet 3) of the sender of the received second signal S2. Also, in step S22, the relay apparatus 2 determines whether or not that e-mail address and registered name are registered in the pattern-conversion-constant data 211a.

In step S22, when the e-mail address and registered name are registered (step S22: Yes), the relay apparatus 2 identifies the pattern-conversion-constant data 111a, and then processing advances to step S23. On the other hand, when the e-mail address and registered name are not registered (step S22: No), the relay apparatus 2 determines that the signal is not from a properly registered sender, and processing ends. When this occurs, it is possible to have the relay apparatus 2 send an e-mail to the recipient notifying that an improper second signal S2 was received.

In step S23, the relay apparatus 2 reads the pattern-conversion constant Zy (packet 5) in the second signal S2. In step S24, the relay apparatus 2 references the pattern-conversion-constant data 111a that was identified in step S22, and reads the conversion constant Zy' that corresponds with the pattern-conversion constant Zy that was read.

Also, in step S25, the relay apparatus 2 uses the conversion constant Zy' that was read in step S24 and creates a second' signal S2'. In step S26 it sends the second' signal S2' that was created in step S25 to the e-mail address of the recipient the was sent together with the second signal S2, and processing ends.

Figure 15:
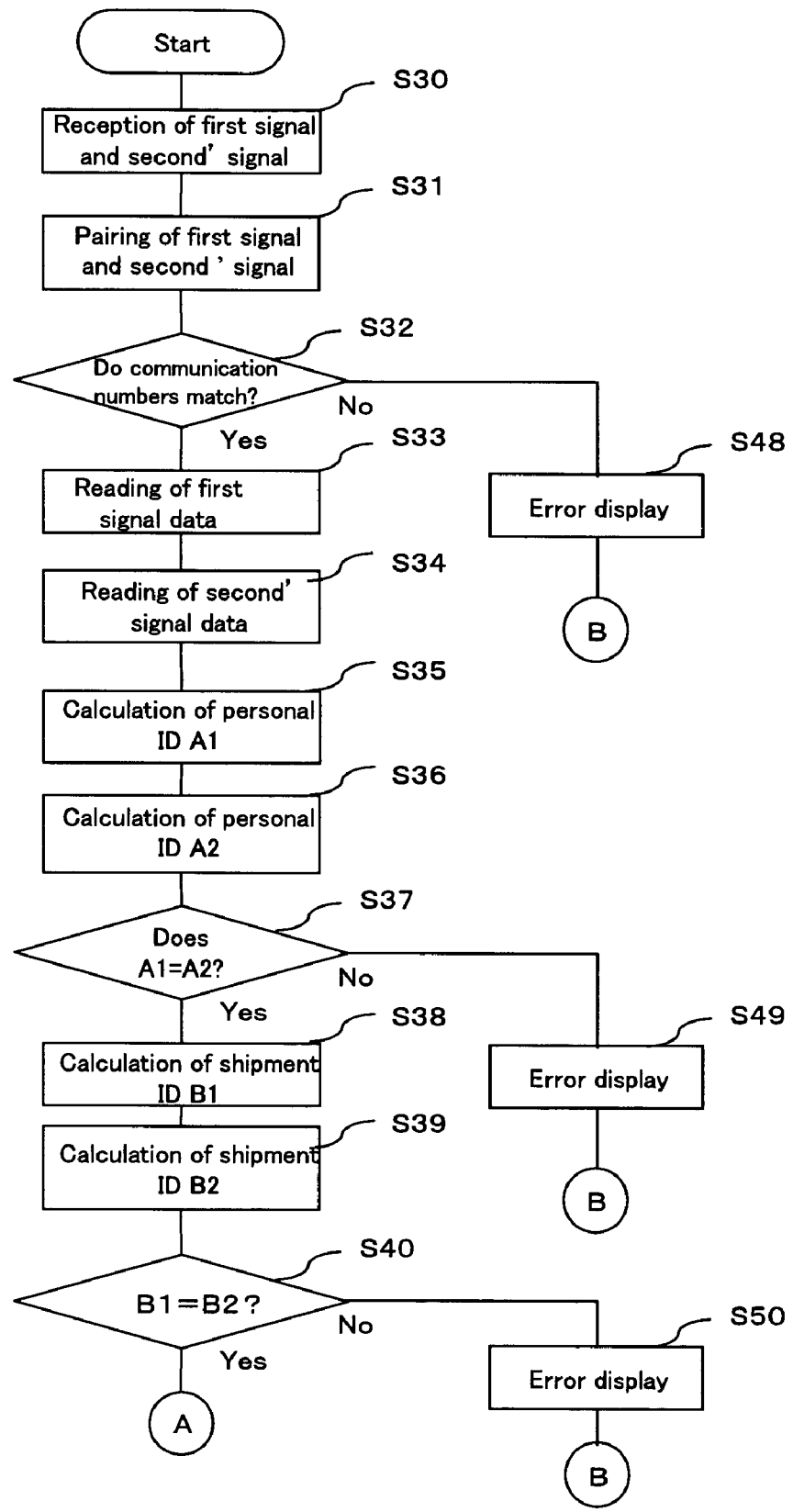
FIG. 15 and FIG. 16 are drawings showing the processing flow of the reception apparatus of an embodiment of the invention.
Figure 16:
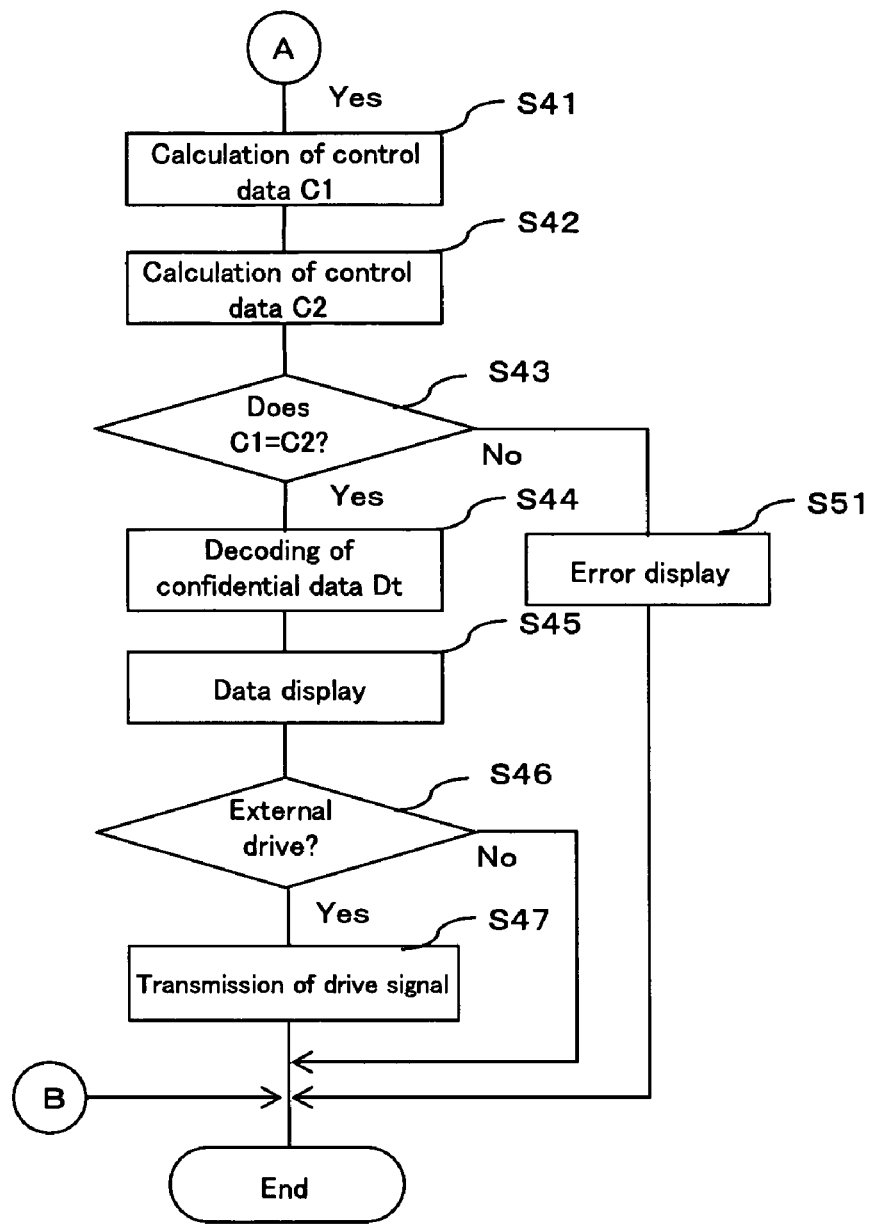

Next, FIG. 15 and FIG. 16 will be used to explain the flow of processing by the apparatus 1 on the receiving side. In step S30, the apparatus 1 receives and obtains the first signal S1 and second' signal 82'. The first signal S1 and second' signal S2' that are obtained by the apparatus 1 are specified by the recipient as being a pair of signals. More specifically, on the screen of the apparatus 1, the recipient specifies the data that was attached to the e-mail received by the recipient as the first signal S1 and second' signal S2'.

In step S32 the apparatus 1 compares the communication numbers (packet 1) of the two specified signals with corresponding data. When the communication numbers of both signals match (step S32: Yes), processing advances to step S33. On the other hand, when the communication numbers of both signals do not match (step S32: No), processing advances to step S48, then an error display indicating that is displayed on the display unit 102 and processing ends.

In step S33, the apparatus 1 reads the data of packet 3 to packet 10 of the first signal S1. Also, in step S34 the apparatus 1 reads the data of packet 3 to packet 10 of the second' signal S2'.

Next, in step S35, the apparatus 1 calculates decoded data A1 using the first equation for decoding the substitute personal ID value Ax. Then in step S36 it calculates decoded data A2 using the second equation for decoding the substitute personal ID value Ay. Also, in step S37, the apparatus 1 compares both the registered names and decoded data A1 and A2 that were read in steps S33 and S34 and determines whether or not they match.

When these match (step S37: Yes), processing advances to step S38. On the other hand, when they do not match (step S37: No), processing advances to step S49, and an error display indicating that the registered names and decoded data A1 and A2 do not match is displayed and processing ends. When they do not match, transmission may have been fraudulent transmission using an improper encryption method, or transmission may have been fraudulent transmission in which the pattern-conversion constant Zy and corresponding conversion constant Zy' do not match.

In step S38, the apparatus 1 calculates decoded data B1 from the first equation for decoding substitute shipment ID value Bx. In step S39 it calculates decoded data B2 from the second equation for decoding substitute shipment ID value By. Also, in step S40, the apparatus 1 compares decoded data B1 and B2, and determines whether or not they match.

When they match (step S40: Yes), processing advances to step S41. On the other hand, when they do not match (step S40: No), processing advances to step S50, then an error display indicating that decoded data B1 and B2 do not match is displayed and processing ends.

In step S41, the apparatus calculates decoded data C1 from the first equation for decoding substitute control data value Cx. In step S42 it calculates decoded data C2 from the first equation for decoding substitute control data value Cy. Also, in step S43 the apparatus 1 compares the decoded data C1 and C2, and determines whether or not they match.

When they match (step S43: Yes), processing advances to step S44. On the other hand, when they do not match (step S43: No), processing advances to step S51, then an error display indicating that decoded data C1 and C2 do not match is displayed and processing ends.

In step S44, the apparatus 1 decodes the confidential data Dt. In step S45, the apparatus 1 displays the decoded data A1, B1 and C1 on the display unit 102 as the personal authentication number A, shipment authentication number B, control data C and confidential data Dt. Also, the type of control data C is displayed according to the control pattern Cp. The confidential data Dt can be configured such that as a condition for opening (decoding) the data, the recipient must manually specify two received signals on the display screen (for example overlap the data files of both signals), and the decoded data A1 and A2 must match.

In step S46, the apparatus 1 determines according to the control pattern Cp whether or not the control data C is a signal for driving an external drive apparatus. When the control data C is external-drive-signal data (step S46: Yes), processing advances to step S47, then the apparatus 1 sends that drive signal to the specified external-drive apparatus, and processing ends. On the other hand, when the control data C is not external-drive-signal data (step S46: No), processing ends.

Figure 17:
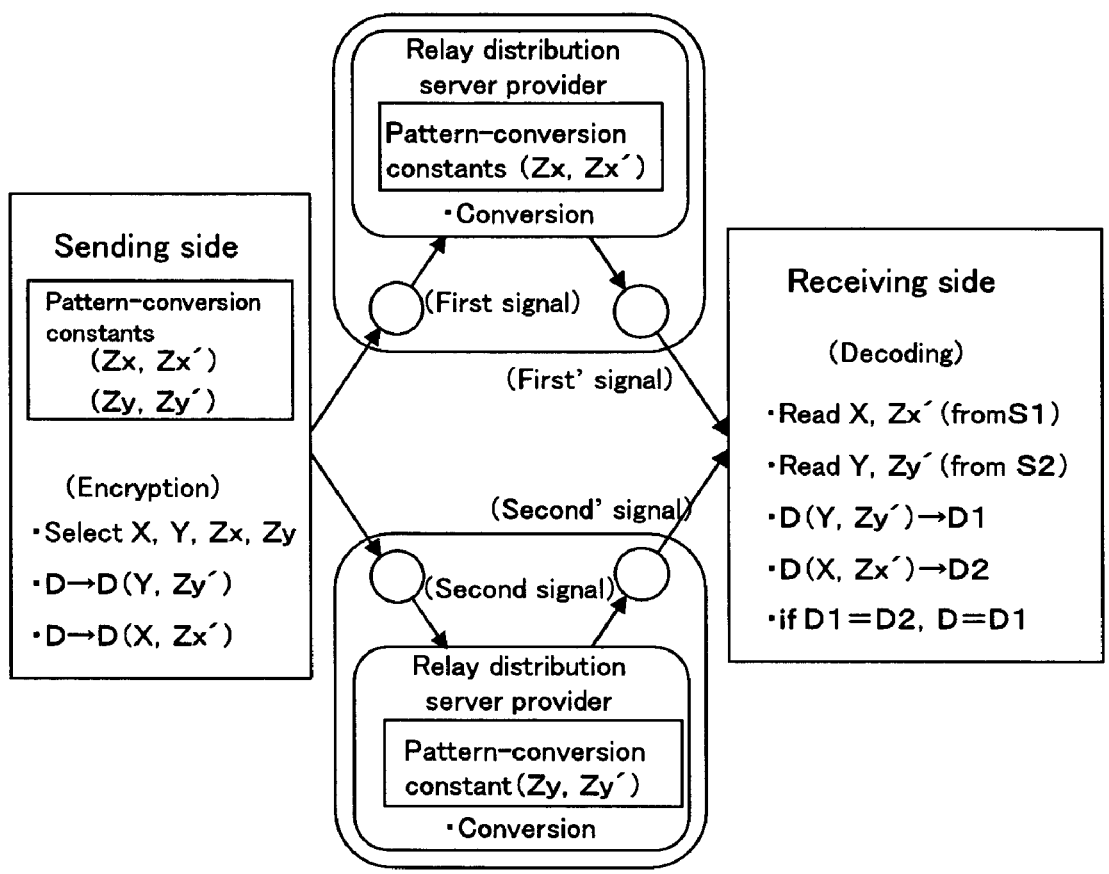
FIG. 17 is a drawing showing an example of a changed form of the first data-transmission method.

In the embodiment described above (first data-transmission method) described above, the first signal S1 was sent directly from the apparatus 1 on the sending side to the apparatus 1 on the receiving side via a provider P, however, the second signal S2 was converted to a second' signal S2' by the relay apparatus 2 and then sent to the apparatus 1 on the receiving side. However, as shown in FIG. 17, it is also possible to send not only the second signal S2, but also the first signal S1 to the apparatus 1 on the receiving side by a separate relay apparatus 2.

In this case, the pattern-conversion-constant data is registered in the apparatus 1 on the sending side and in the two relay apparatuses 2. Also, in the apparatus 1 on the sending side and two relay apparatuses 2, the conversion constants X and Y that are selected by random numbers, and the conversion constants Zx' and Zy' that are identified by specifying pattern-conversion constants Zx and Zy are used as encryption keys.

The apparatus 1 on the sending side uses the conversion constants Y and Zy' to encrypt transmission data D to encrypted data D(Y,Zy') (for example, D(Y,Zy')=D+Y+Zy'), and it uses conversion constants X. Zx' to encrypt the transmission data D to encrypted data D(X,Zx') (for example, D(X,Zx')=D+X+Zx').

Also, the first signal S1 contains encrypted data D(Y,Zy'), conversion constant X and pattern-conversion constant Zx. The second signal S2 contains encrypted data D(X,Zx'), conversion constant Y and pattern-conversion constant Zy. These signals are sent from the apparatus 1 on the sending side to the first relay apparatus 2 and second relay apparatus 2, respectively.

The first relay apparatus 2 converts the pattern-conversion constant Zx in the first signal S1 to conversion constant Zx' and creates a first' signal S1', then transfers this first' signal S1' to the address of the apparatus 1 on the receiving side. Also, the second relay apparatus 2 converts the pattern-conversion constant Zy in the second signal S2 to conversion constant Zy' and creates a second' signal S2', then transfers this second' signal S2' to the address of the apparatus 1 on the receiving side.

The apparatus 1 on the receiving side reads the conversion constants X and Zx' from the first' signal S1', and reads the conversion constants Y and Zy' from the second' signal S2'. Then according to the conversion constants X, Y, Zx' and Zy' that were read, the apparatus 1 decodes the first' signal S1' and second' signal S2' to decoded data D1 and D2, respectively. Also, the apparatus 1 on the receiving side performs a comparison to authenticate the decoded data D1 and D2, and when both match, uses decoded data D1 (or D2) as the transmission data D.

In this way, two transmission signals contain encrypted data that are encrypted using different conversion constants Zx' and Zy', respectively, and the two transmission signals contain a pattern-conversion constant that corresponds to a conversion constant that is not a conversion constant used for encryption. Moreover, the two transmission signals are sent by separate routes to separate relay apparatuses 2, and the relay apparatuses 2 convert the pattern-conversion constants contained in the transmission signals to conversion constants, and then transfer the respective converted transmission signals to the apparatus 1 on the receiving side.

By sending, converting and transferring the transmission signals by way of two routes and two relay apparatuses 2 in this way, it is possible to further improve the confidentiality of the data, and better prevent improper activity such as fraudulent transmission.

Figure 18:
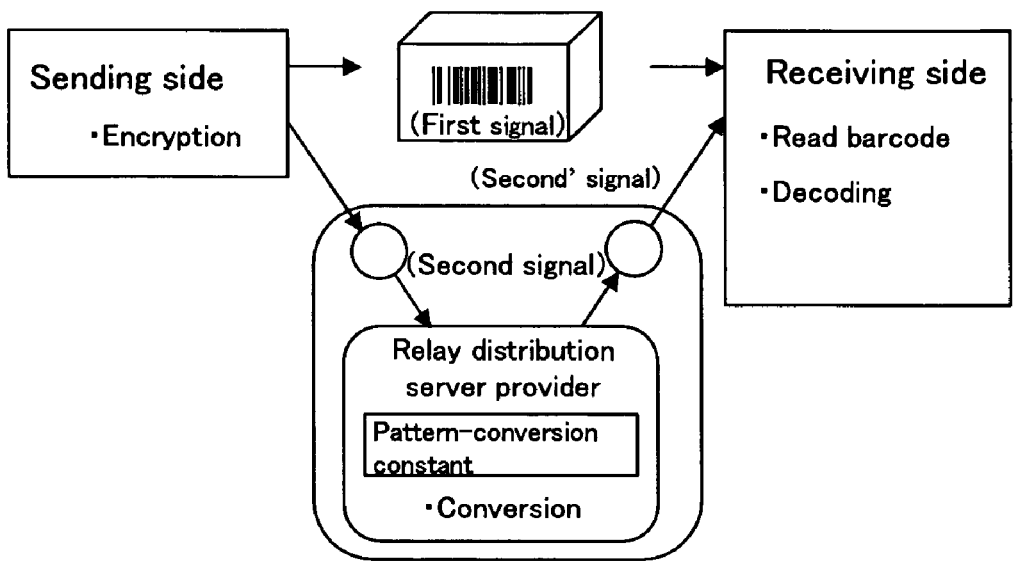
FIG. 18 is a drawing showing an example of a changed form of the first data-transmission method.

Moreover, in the embodiment described above, both the first signal S1 and second signal S2 were sent from the sending side to the receiving side by via the Internet, however, the invention is not limited to this, and as shown in FIG. 18, it is possible to attach and send a first signal S1 that was output as a barcode to a shipped product, and to send the second signal S2 to the receiving side by way of a relay apparatus 2 via the Internet.

The apparatus 1 on the receiving side reads the first signal S1 using a barcode reader, and receives the second' signal S2' via the Internet. Using both of these signals, it is possible to decode the shipment authentication number B and to perform authentication.

Figure 19:
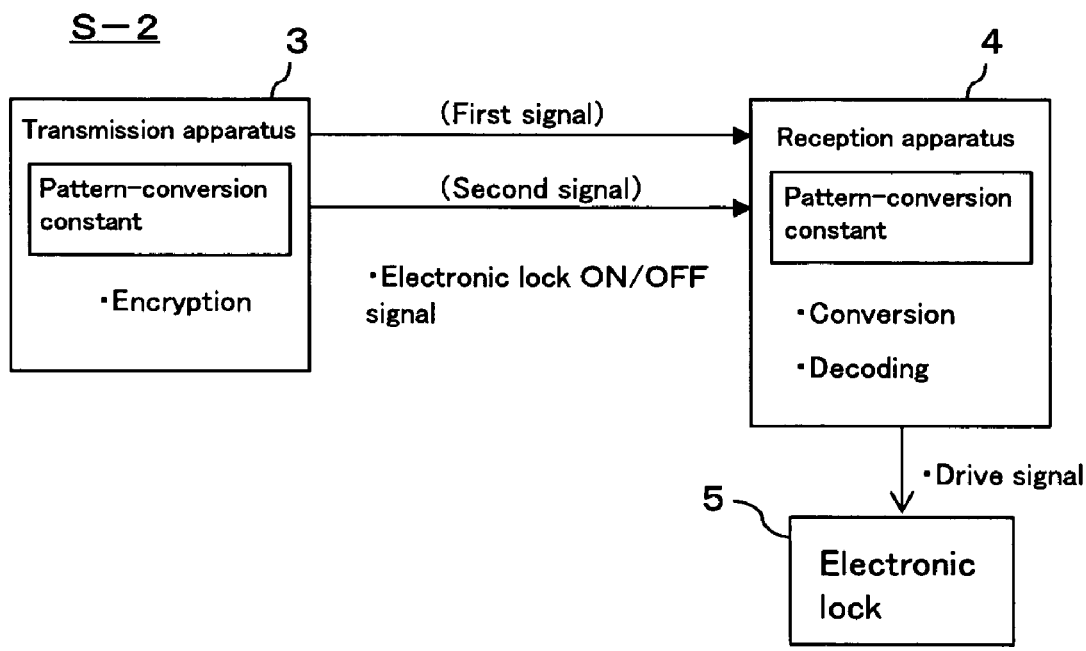
FIG. 19 is a drawing explaining the data-transmission system of another embodiment of the invention.

Next, FIG. 19 will be used to explain an embodiment that uses a second data-transmission method. In this embodiment, an example will be explained in which the invention is applied to a lock system S-2 that locks/unlocks an electronic lock by remote control. This system S-2 comprises an apparatus 3 that sends a first signal S1 and second signal S2, an apparatus 4 that receives both signals and performs drive control of an external-drive apparatus, and an electronic lock 5 as the external-drive apparatus. This second data-transmission method can also be applied to personal authentication for a personal computer or the like.

Apparatus 3 is a card-shaped thin, compact apparatus, and using infrared rays sends a first signal S1 and second signal S2 to the apparatus 4. Also, the infrared-ray receiver of the apparatus 4 receives the infrared signals, and after authenticating the signals sends the open/close drive signal to the electronic lock 5, which is the external-drive apparatus. The electronic lock 5 receives the lock/unlock drive signal, and locks or unlocks the electronic lock.

Figure 20:
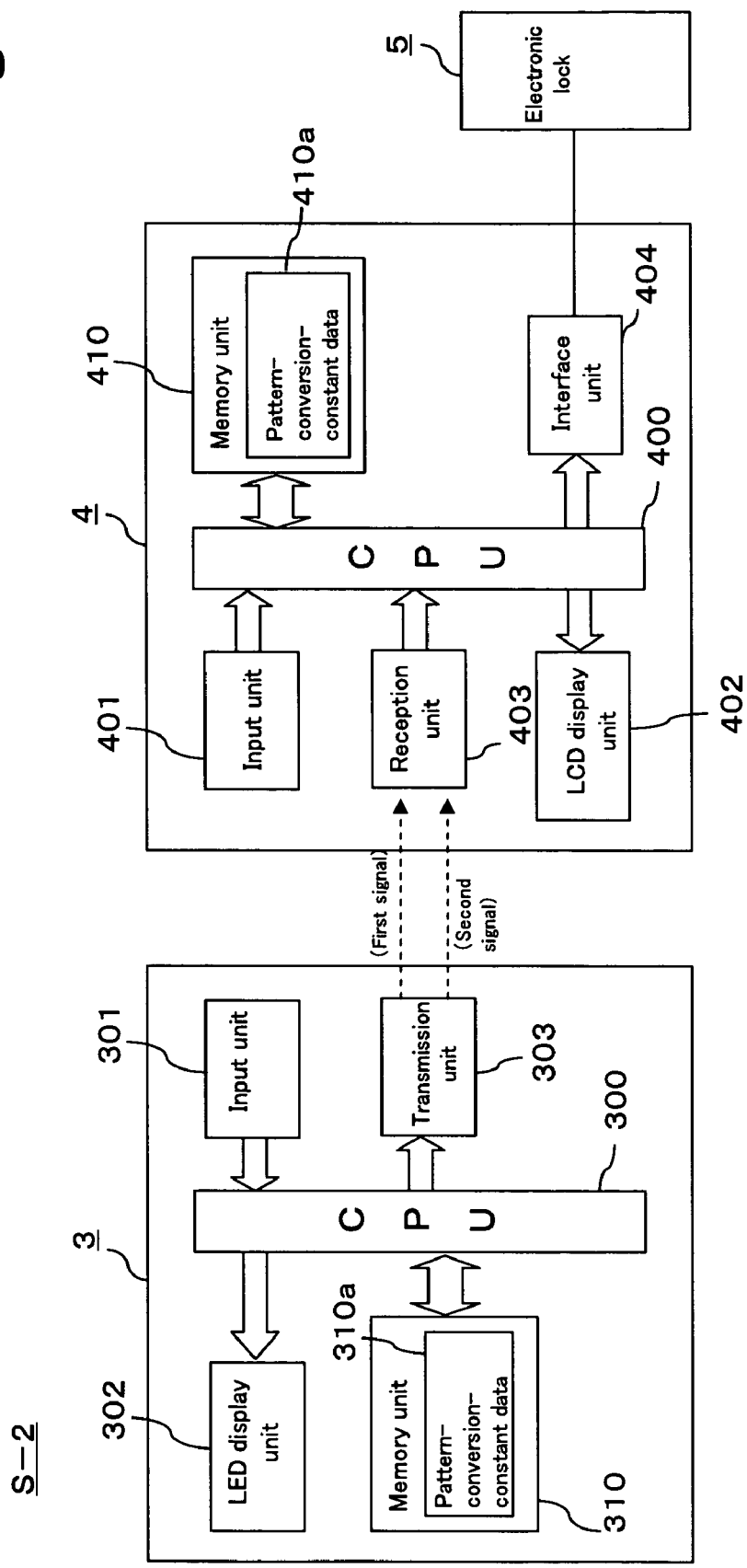
FIG. 20 is a schematic drawing of the components of the data-transmission system of another embodiment of the invention.

FIG. 20 will be used to explain the construction of the apparatus 3 and apparatus 4 of this system S-2. The apparatus 3 comprises a CPU 300, which is an IC chip that functions as a control unit, an input unit 301, which is a control panel, a transmission unit 303, which is a data-transmission circuit, a display unit 302 that performs display using an LED, and a memory unit 310.

The CPU 300 performs control such as controlling data input/output, data transmission, conversion-constant-selection process, data encryption, signal-creation process, etc. The input unit 301 comprises a ten key, switches for specified functions such as an 'OPN' (open) switch, 'CLS" (close) switch, register switch, send switch, etc., and other switches.

The display unit 302 performs display using an LED according to output from the CPU 300. The transmission unit 303 has a signal-transmission element that sends data signals to the apparatus 4. The memory unit 310 stores data such as the personal authentication number A, control program for the CPU 300, pattern-conversion-constant data 310a and the like, and it also functions as a work area.

The personal authentication number A is stored on an authentication card belonging to the sender, and the apparatus 3 may be constructed such that it reads the personal authentication number A from the authentication card using a contact or non-contact method.

The apparatus 4 comprises: a CPU 400, which is a control unit; an input unit 401, which has a control panel and setting panel; a display unit 402, which is an LCD display device; a receiving unit 403, which receives data signals from the apparatus 3; a memory unit 410; and an interface unit 404, which is an interface with the external-drive apparatus.

The CPU 400 performs control such as controlling data input/output receiving data, reading data, decoding data, authentication processing, and sending of drive signals to the external-drive apparatus. The input unit 401 comprises various switches, a ten-key, alphabet keys, and switches for special functions (for example power ON/OFF switch, door open/close switch, etc.).

The display unit 402 displays the decoded data according to output from the CPU 400, and displays input data during operation. The receiving unit 403 has a receiving head that receives data from the apparatus 3.

The memory unit 410 stores a personal authentication number A, pattern-conversion-constant data 410a, a control program for the CPU 400, and the like, and it also functions as a work area for the program. The pattern-conversion-constant data 410a is the same as the pattern-conversion-constant data 310a of apparatus 3. The pattern-conversion-constant data can be sent to the apparatus 4 from the apparatus 3 and registered.

The method for sending data between the apparatus 3 and apparatus 4 is not limited to infrared rays, and a radio-wave method, optical-communications method, wired-communications method, or the like could also be applied.

The electronic lock 5, which is the external-drive apparatus, is connected to the interface unit 404 of the apparatus 4, and unlocks the electronic lock according to an unlock-drive signal from the apparatus 4, and locks the electronic lock according to a lock-drive signal. Also, it is possible to connect a plurality of electronic locks 5 as external-drive apparatuses.

Figure 21:
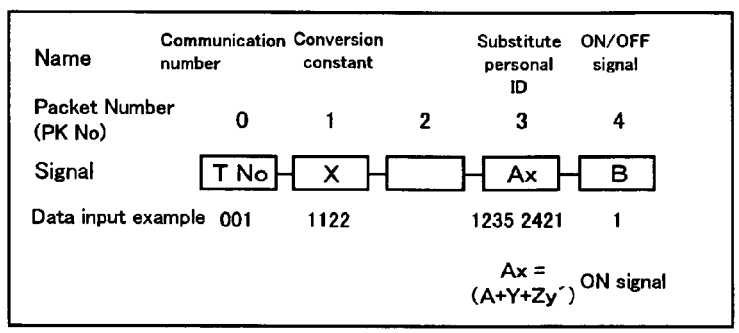
FIG. 21 is a drawing explaining the configuration of a first signal of another embodiment of the invention.
Figure 22:
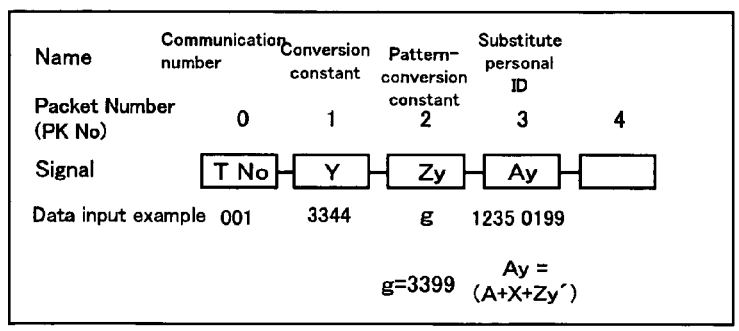
FIG. 22 is a drawing explaining the configuration of another embodiment of the invention.

Next, FIG. 21 and FIG. 22 will be used to explain the first signal S1 and second signal S2 that are sent from the apparatus 3 to the apparatus 4. The parts that are redundant with the embodiment described above will be omitted. The first signal S1 and second signal S2 have five data areas, packet 0 to packet 5. Packet 0 is an area for storing the communication number. Packet 1 is an area for storing the conversion constant X or Y. Packet 2 is an area for storing the pattern-conversion constant Zy. The pattern-conversion constant Zy is only stored in the second signal S2.

Packet 3 is an area for storing the substitute personal ID value Ax or Ay. Packet 4 is an area for storing the ON/OFF signal that indicates the lock or unlock operation. The signal is '1' when indicating the unlock operation, and is '0' when indicating the lock operation. In the case of operating a plurality of electronic locks 5, it is possible to have a packet area for distinguishing between each electronic lock 5.

That packet can be configured such that it stores a registration number assigned to each respective electronic lock 5, and according to that registration number it is possible to distinguish which electronic lock 5 the drive signal from the apparatus 4 is output for.

The method of using the conversion constants X, Y and Zy' to encrypt the personal authentication number A is the same as in the embodiment described above. In this embodiment, the ON/OFF signal is not encrypted, however, it may also be encrypted in the same way as the personal authentication number A. Also, the combination of pattern-conversion constant Zy and corresponding conversion constant Zy' is registered in both apparatus 3 and apparatus 4.

Next, the operation of this system S-2 will be explained. When the sender uses the input unit 301 of the apparatus 3 to enter unlock or lock data (presses the OPN (open) switch or CLS (close) switch), a message ('OPEN' or 'CLOSE' display) indicating that is displayed on the display unit 302. Next, the sender operates the switch for specifying the pattern-conversion constant Zy (for example, Zy='g'), and presses the send switch on the input unit 301.

At the timing that the send switch is pressed, the CPU 300 selects conversion constants X and Y using random numbers (for example, X=1122, Y=3344), and selects the conversion constant Zy' that corresponds to the specified pattern-conversion constant Zy (for example, Zy'=3399). The conversion constant Zy' can also be automatically selected by the CPU 300.

Next, the CPU 300 encrypts the personal authentication number A using the conversion constants X, Y and Zy'. In the example shown in FIG. 20 and FIG. 21, the substitute personal ID value Ax becomes '12352421' (Ax=A+Y+Zy'), and the substitute personal ID value Ay becomes '12350199' (Ay=A+X+Zy'). The CPU 300 combines and arranges this encrypted data and generates the first signal S1 and second signal S2. The first equation for encrypting the personal authentication number A can be Ax=A+Y+Zy' and the second equation can be Ay=A+X, or the first equation can be Ax=A+Y, and the second equation can be Ay=A+X+Zy'.

After the first signal S1 and second signal S2 have been generated, the CPU 300 sends those signals from the transmission unit 303 to the receiving unit 403 of the apparatus 4, leaving a specified time interval in between. When doing this, each signal can be sent a plurality of times each. Moreover, construction is also possible such that there is a sending/receiving unit in the apparatus 3 and apparatus 4, and when the first signal S1 is sent from the apparatus 3 to the apparatus 4, an answer back signal is sent back from the apparatus 4 to the apparatus 3, and by having receiving that answer back signal within a specified amount of time as a condition, it is possible to then send the second signal S2 from the apparatus 3 to the apparatus 4.

In the apparatus 4, after the receiving unit 403 receives the first signal S1 and second signal S2 within a specified amount of time, the CPU 400 reads those signals. The CPU 400 determines whether or not the communication numbers (packet 0) of these signals match, and when they match, continues on to the authentication and decoding processes. However, when the communication numbers do not match, processing ends. When this happens, it is possible to output an audio message indicating that the communication numbers did not match. Construction is also possible in which, before sending both of the signals to the apparatus 4, the sender's password is entered at the apparatus 4, and with proper verification of that password as a condition, it becomes possible for the apparatus 4 to receive both of the signals.

When the communication numbers match, the CPU 400 references the pattern-conversion-constant data 410a and reads the conversion constant Zy' that corresponds to the pattern-conversion constant Zy in the second signal S2. The substitute personal ID values Ax, Ay are decoded by the conversion constants Y and Zy' and conversion constants X and Zy', respectively. The CPU 400 also determines whether or not the obtained decoded data A1 (A1=Ax−Y−Zy') and A2 (A2=Ay−X−Zy') match. Also, using different encryption methods, the decoded data becomes A1=Ax−Y−Zy' and A2=Ay−X, or A1=Ax−Y and A2=Ay−X−Zy'.

When both decoded data match, the sender is authenticated as being an a proper sender, and the CPU 400 sends a unlock/lock drive signal to the external-drive apparatus (electronic lock 5) via the interface unit 404 based on the ON/OFF signal (packet 4). On the other hand, when both decoded data do not match, it is determined that the signals are fraudulent signals from someone posing as the sender, and an audio warning is output.

It is also possible to authenticate that the sender is a proper sender, when both decoded data match, and further when the personal authentication number A stored in the apparatus 4 and decoded data also match. By doing this, it is possible to even more effectively delete fraudulent transmissions.

As described above, common pattern-conversion-constant data 310a and 410a are stored in the apparatus 3 and apparatus 4, and in addition to the conversion constants X, Y that are contained in and sent with the first signal S1 and second signal S2, the conversion constant Zy' is used for encryption. Therefore, even supposing a fraudulent transmission signal had the same data arrangement, unless the encryption method by conversion constants X, Y and Zy' and the correlation between the pattern-conversion constant Zy and conversion constant Zy' are known, the apparatus will determine that a fraudulent signal has been received.

In this way, in this system S-2 the apparatus 4 and electronic key 5 become impossible to operate, so it is possible to maintain a high level of safety.

INDUSTRIAL APPLICABILITY

With the present invention described above, as a first transmission method, when transmission data is sent from the apparatus on the sending side, a first signal and second signal, which each contain the encrypted transmission data, are set, and these signals are sent by separate routes. A substitute value for the transmission data that has been encrypted using a second conversion constant and third conversion constant (or second conversion constant only) is placed with a first conversion constant in the first signal and sent. On the other hand, a substitute value for the transmission data that has been encrypted by the first conversion constant and a third conversion constant (or first conversion constant only) is placed with the second conversion constant and a pattern-conversion constant that corresponds with the third conversion constant in the second signal and sent.

Therefore, since each signal is sent by a separate route, safety is maintained, and since the third conversion constant itself is not contained in the first or second signal, it is not possible for a third party to decode the transmission data even supposing both of the signals were leaked, and thus confidentiality is also maintained.

Also, the second signal is first sent to the relay apparatus where the pattern-conversion constant contained in the second signal is converted to a corresponding third conversion constant, and this signal is then transferred to the apparatus on the receiving side. Therefore, by registering correspondence data on the sending side for the pattern-conversion constant and third conversion constant, and also registering the same data on the relay apparatus, the relay apparatus is able to convert the second signal.

By doing this, together with being able to maintain the confidentiality of the transmission data, by further registering a plurality of pattern-conversion constants, it is possible to further improve the confidentiality. Also, since it is not necessary to register the pattern-conversion constant in the apparatus on the receiving side, it is possible to use the same pattern-conversion constant for encrypting data to send from the apparatus on the sending side to a plurality of apparatuses on the receiving side, and thus freedom of encryption is improved.

Moreover, even though encryption and decoding of authentication data is simple using conversion constants, it is possible to send data safely, and since the configuration of the data transmission is simple, it is possible to construct a data-transmission system without high cost.

Also, even though a third party may pose as the original sender and send data, unless the correlation between the pattern-conversion constant and third conversion constant is known, it is not possible for the apparatus on the receiving side to decoded meaningful data when decoding the transmission data from both signals, so it is possible easily determine that the transmission is fraudulent.

Moreover, since it is possible for the apparatus on the receiving side to decode data by combining the first signal from the apparatus on the sending side and the second' signal from the relay apparatus, even though the second' signal may be sent without going through the relay apparatus, it is possible to determine that the transmission is a fraudulent transmission from the sender's address.

Also, as a second transmission method, even when the first signal and second signal are sent from the apparatus on the sending side to the apparatus on the receiving side without going through the relay apparatus, the transmission data is encrypted using a first conversion constant, second conversion constant and third conversion constant, and the first and second conversion constants are contained in the first signal or second signal and sent; however, the third conversion constant itself is not sent, and in its place, a pattern-conversion constant that corresponds to the third conversion constant is contained in the transmission signal.

By registering the pattern-conversion constant in both the apparatus on the sending side and the apparatus on the receiving side, the apparatus on the receiving side is able to know the third conversion constant that corresponds to the pattern-conversion constant contained in the received signal, and is able to decode the transmission data from the first signal and second signal.

By doing this, even though the first signal and second signal may be leaked during transmission, it is not possible for a third party who does not know the third conversion constant corresponding to the pattern-conversion constant to decode the transmission data, and thus it is possible to maintain confidentiality.

Also, in the case of a fraudulent transmission, the relationship between the pattern-conversion constant contained in the second signal of the fraudulent transmission, and the third conversion constant used in encrypting the transmission data does not match the relationship between the proper pattern-conversion constant and the third conversion constant, so the decoded data that is decoded from both signals is not decoded as meaningful data, and thus it is possible to easily determine that the transmission is fraudulent.

As described above, together with making it possible to prevent trouble due to fraudulent transmission by performing personal authentication of the sender on the receiving side even when a third party posing as the original sender sends data, this invention also makes it possible to provide a data-transmission system, data-transmission method and data-transmission apparatus for transmitting highly confidential data.

What is claimed is:

1. A data-transmission system that sends transmission data, which has been encrypted by using at least one conversion constant from among a first conversion constant, a second conversion constant, and a third conversion constant, from an apparatus on a sending side to an apparatus on a receiving side, wherein said apparatus on the sending side comprises:
a conversion-constant selection means for selecting said first conversion constant, said second conversion constant, and said third conversion constant;
an encryption means for using said second conversion constant, or said second conversion constant and said third conversion constant, to encrypt said transmission data to a first substitute value, and for using said first conversion constant, or said first conversion constant and said third conversion constant, to encrypt said transmission data to a second substitute value;
a first-signal-generation means for generating a first signal that contains said first substitute value and said first conversion constant;
a memory means for storing a pattern-conversion constant that corresponds to said third conversion constant;
a second-signal-generation means for generating a second signal that contains said second substitute value, said second conversion constant and said pattern-conversion constant; and
a transmission means for sending said first signal to said apparatus on the receiving side and for sending said second signal to a relay apparatus;

said relay apparatus comprises:
a memory means for storing said third conversion constant that corresponds to said pattern-conversion constant;
a signal-generation means for receiving said second signal, and for converting said pattern-conversion constant contained in said second signal to said third conversion constant to generate a third (second') signal; and
a transmission means for sending said third signal to said apparatus on the receiving side; and said apparatus on the receiving side comprises:
a reading means for receiving said first signal from said apparatus on the sending side and said third signal from said relay apparatus, and for reading said first substitute value and said first conversion constant from said first signal, and for reading said second substitute value, said second conversion constant and said third conversion constant from said third signal;
a decoding means for using said conversion constants that were used in encrypting said first substitute value and said second substitute value to decode said first substitute value and said second substitute value to first decoded data and second decoded data, respectively; and
an authentication means for authenticating said first signal and said third signal from said first decoded data and said second decoded data.

2. A data-transmission system that sends transmission data, which has been encrypted by two conversion constants from among a first conversion constant, a second conversion constant, a third conversion constant, and a fourth conversion constant, from an apparatus on a sending side to an apparatus on a receiving side, wherein said apparatus on the sending side comprises:
a conversion-constant-selection means for selecting said first conversion constant, said second conversion constant, said third conversion constant and said fourth conversion constant;
an encryption means for using said second conversion constant and said fourth conversion constant to encrypt said transmission data to a first substitute value, and for using said first conversion constant and said third conversion constant to encrypt said transmission data to a second substitute value;
a memory means for storing first and second pattern-conversion constants that respectively correspond to said third conversion constant and said fourth conversion constant;
a first-signal-generation means for generating a first signal that contains said first substitute value, said first conversion constant, and said first pattern-conversion constant or said second pattern-conversion constant;
a second-signal-generation means for generating a second signal that contains said second substitute value, said second conversion constant, and said first pattern-conversion constant or said second pattern-conversion constant that is not contained in said first signal; and
a transmission means for sending said first signal to a first relay apparatus and sending said second signal to a second relay apparatus;

said first relay apparatus comprises:
  a memory means for storing said third conversion constant or said fourth conversion constant that respectively corresponds to said first or second pattern-conversion constant;
  a signal-generation means for receiving said first signal and for converting the first or second pattern-conversion constant contained in the first signal to said third conversion constant or said fourth conversion constant to generate a third (first') signal; and
  a transmission means for sending said third signal to said apparatus on the receiving side;
said second relay apparatus comprises:
  a memory means for storing said third conversion constant or said fourth conversion constant that respectively corresponds to said first or second pattern-conversion constant,
  a signal-generation means for receiving said second signal and for converting said first or second pattern-conversion constant contained in the second signal to said third conversion constant or said fourth conversion constant to generate a fourth (second') signal; and
  a transmission means for sending said fourth signal to said apparatus on the receiving side; and
said apparatus on the receiving side comprises:
  a reading means for receiving said third signal and said fourth signal and for reading said first substitute value, said first conversion constant and said third conversion constant or said fourth conversion constant from said third signal, and for reading said second substitute value, said second conversion constant and said third conversion constant or said fourth conversion constant from said fourth signal;
  a decoding means for using the conversion constants that were used for encrypting said first substitute value and said second substitute value to decode said first substitute value and said second substitute value to first decoded data and second decoded data, respectively; and
  an authentication means for performing authentication of said third signal and said fourth signal from said first decoded data and said second decoded data.

3. A data-transmission system that sends transmission data, which has been encrypted using at least one conversion constant from among a first conversion constant, a second conversion constant, and a third conversion constant, from an apparatus on a sending side to an apparatus on a receiving side, wherein
said apparatus on the sending side comprises:
  a conversion-constant-selection means for selecting said first conversion constant, said second conversion constant, and said third conversion constant;
  an encryption means for using said second conversion constant, or said second conversion constant and said third conversion constant to encrypt said transmission data to a first substitute value, and for using said first conversion constant, or said first conversion constant and said third conversion constant to encrypt said transmission data to a second substitute value;
  a first-signal-generation means for generating a first signal that contains said first substitute value and said first conversion constant;
  a memory means for storing a pattern-conversion constant that corresponds to said third conversion constant;
  a second-signal-generation means for generating a second signal that contains said second substitute value, said second conversion constant and said pattern-conversion constant; and
  a transmission means for sending said first signal and said second signal to said apparatus on the receiving side; and
said apparatus on the receiving side comprises:
  a reading means for receiving said first signal and said second signal, and for reading said first substitute value and said first conversion constant from said first signal, and for reading said second substitute value, said second conversion constant, and said pattern-conversion constant from said second signal;
  a memory means for storing said third conversion constant that corresponds to said pattern-conversion constant;
  a reading means for reading said third conversion constant from said read pattern-conversion constant;
  a decoding means for using the conversion constants that were used to encrypt said first substitute value and said second substitute value to decode said first substitute value and said second substitute value to first decoded data and second decoded data, respectively; and
  an authentication means for authenticating said first signal and said second signal from said first decoded data and second decoded data.

4. The data-transmission system of claim 1 or claim 3 wherein said encryption means uses said second conversion constant and third conversion constant to encrypt said transmission data to said first substitute value, and uses said first conversion constant and said third conversion constant to encrypt said transmission data to said second substitute value.

5. The data-transmission system of claim 1 or claim 3 wherein said encryption means uses said second conversion constant to encrypt said transmission data to said first substitute value, and uses said first conversion constant and said third conversion constant to encrypt said transmission data to said second substitute value.

6. The data-transmission system of claim 1 or claim 3 wherein said encryption means uses said second conversion constant and third conversion constant to encrypt said transmission data to said first substitute value, and uses said first conversion constant to encrypt said transmission data to said second substitute value.

7. The data-transmission system of any one of the claims 1 to 3 wherein said apparatus on the receiving side further comprises a drive-signal-transmission means for sending a drive signal for driving an external-drive apparatus based on said first decoded data and second decoded data.

8. The data-transmission system of any one of the claims 1 to 3 wherein said authentication means performs said authentication when said first decoded data and said second decoded data match.

9. The data-transmission system of claim 1 or claim 2 wherein said apparatus on the sending side, said relay apparatus and said apparatus on the receiving side are connected to a communications network that includes the Internet.

10. The data-transmission system of claim 3 wherein said apparatus on the sending side and said apparatus on the receiving side send or receive signals by an infrared signal method, wireless signal method, optical communication method or wired communication method.

11. A data-transmission method that sends transmission data, which has been encrypted using at least one conversion constant from among a first conversion constant, a second conversion constant, and a third conversion constant, from an apparatus on a sending side to an apparatus on a receiving side, wherein said apparatus on the sending side comprises:

a step of selecting said first conversion constant, said second conversion constant and said third conversion constant;

an encryption step of using said second conversion constant, or said second conversion constant and said third conversion constant to encrypt said transmission data to a first substitute value, and using said first conversion constant, or said first conversion constant and said third conversion constant to encrypt said transmission data to a second substitute value;

a first-signal-generation step of generating a first signal that contains said first substitute value and said first conversion constant;

a second-signal-generation step of generating a second signal that contains said second substitute value, said second conversion constant and a pattern-conversion constant that corresponds to said third conversion constant; and a first transmission step of sending said first signal to said apparatus on the receiving side and said second signal to a relay apparatus;

said relay apparatus comprises:

a conversion step of receiving said second signal, and converting the pattern-conversion constant contained in said second signal to said corresponding third conversion constant to generate a third (second') signal; and a second transmission step of sending said third signal to said apparatus on the receiving side; and said apparatus on the receiving side comprises:

a reading step of receiving said first signal from said apparatus on the sending side and said third signal from said relay apparatus, and reading said first substitute value and said first conversion constant from said first signal, and reading said second substitute value, said second conversion constant and said third conversion constant from said third signal;

a decoding step of using the conversion constants that were used in encrypting said first substitute value and said second substitute value to decode said first substitute value and said second substitute value to first decoded data and second decoded data, respectively; and an authentication step of authenticating said first signal and said third signal from said first decoded data and said second decoded data.

12. A data-transmission method that sends transmission data, which has been encrypted using two conversion constants from among a first conversion constant, a second conversion constant, a third conversion constant, and a fourth conversion constant, from an apparatus on a sending side to an apparatus on a receiving side, wherein said apparatus on the sending side comprises:

a selection step of selecting said first conversion constant, said second conversion constant, said third conversion constant, and said fourth conversion constant;

an encryption step of using said second conversion constant and said fourth conversion constant to encrypt said transmission data to a first substitute value, and using said first conversion constant and said third conversion constant to encrypt said transmission data to a second substitute value;

a first-signal-generation step of generating a first signal that contains said first substitute value, said first conversion constant, and a first pattern-conversion constant that corresponds to said third conversion constant or said fourth conversion constant;

a second-signal-generation step of generating a second signal that contains said second substitute value, said second conversion constant, and a second pattern-conversion constant that corresponds to said third conversion constant or said fourth conversion constant that is not contained in said first signal; and a first transmission step of sending said first signal to a first relay apparatus, and sending said second signal to a second relay apparatus;

said first relay apparatus and said second relay apparatus comprise:

a conversion step of receiving said first signal or said second signal and converting said first or second pattern-conversion constant contained in the respective first or second signal to the corresponding third conversion constant or fourth conversion constant to generate a third (first') signal or fourth (second') signal; and a second transmission step of sending said third signal or said fourth signal to said apparatus on the receiving side; and said apparatus on the receiving side comprises:

a reading step of receiving said third signal and said fourth signal, and reading said first substitute value, said first conversion constant, and said third conversion constant or said fourth conversion constant from said third signal, and reading said second substitute value, said second conversion constant, and said third or said fourth conversion constant from said fourth signal;

a decoding step of using the conversion constants that were used in encrypting said first substitute value and said second substitute value to decode said first substitute value and said second substitute value to first decoded data and second decoded data, respectively; and an authentication step of authenticating said third signal and said fourth signal from said first decoded data and said second decoded data.

13. A data-transmission method that sends transmission data, which has been encrypted using at least one conversion constant from among a first conversion constant, a second conversion constant, and a third conversion constant, from an apparatus on a sending side to an apparatus on a receiving side, wherein said apparatus on the sending side comprises:

a step of selecting said first conversion constant, said second conversion constant, and said third conversion constant;

an encryption step of using said second conversion constant or said second conversion constant and said third conversion constant to encrypt said transmission data to a first substitute value, and using said first conversion constant or said first conversion constant and said third conversion constant to encrypt said transmission data to a second substitute value;

a first-signal-generation step of generating a first signal that contains said first substitute value and said first conversion constant;

a second-signal-generation step of generating a second signal that contains said second substitute value, said second conversion constant, and a pattern-conversion constant that corresponds to said third conversion constant; and a transmission step of sending said first signal and said second signal to said apparatus on the receiving side; and said apparatus on the receiving side comprises:

a reading step of receiving said first signal and said second signal, and reading said first substitute value and said first conversion constant from said first signal, and reading said second substitute value, said second conversion constant, and said pattern-conversion constant from said second signal;

a conversion-constant-acquisition step of acquiring said third conversion constant that corresponds to said read pattern-conversion constant;

a decoding step of using the conversion constants that were used to encrypt said first substitute value and said second substitute value to decode said first substitute value and said second substitute value to first decoded data and second decoded data, respectively; and an authentication step of authenticating said first signal and said second signal from said first decoded data and said second decoded data.

14. The data-transmission method of claim 11 or claim 13 wherein in said encryption step said second conversion constant and said third conversion constant are used to encrypt said transmission data to said first substitute value, and said first conversion constant and said third conversion constant are used to encrypt said transmission data to said second substitute value.

15. The data-transmission method of claim 11 or claim 13 wherein in said encryption step, said second conversion constant is used to encrypt said transmission data to said first substitute value, and said first conversion constant and said third conversion constant are used to encrypt said transmission data to said second substitute value.

16. The data-transmission method of claim 11 or claim 13 wherein in said encryption step, said second conversion constant and said third conversion constant are used to encrypt said transmission data to said first substitute value, and said first conversion constant is used to encrypt said transmission data to said second substitute value.

17. The data-transmission method of any one of the claims 11 to 13 wherein after said authentication step, said apparatus on the receiving side further comprises a drive-signal-transmission step of sending a drive signal for driving an external-drive apparatus based on said first decoded data or said second decoded data.

18. The data-transmission method of any one of the claims 11 to 13 wherein in said authentication step, authentication is performed when said first decoded data matches said second decoded data.

19. An apparatus that sends data that has been encrypted using at least one conversion constant from among a first conversion constant, a second conversion constant and a third conversion constant comprising:

a memory unit that stores at least a pattern-conversion constant that corresponds to said third conversion constant;

a control unit, which performs a conversion-constant-selection process of selecting said first conversion constant, said second conversion constant, and said third conversion constant, an encryption process of using said second conversion constant, or said second conversion constant and said third conversion constant to encrypt said transmission data to a first substitute value, and using said first conversion constant, or said first conversion constant and said third conversion constant to encrypt said transmission data to a second substitute value, a first-signal-generation process of generating a first signal that contains said first substitute value and said first conversion constant, a second-signal-generation process of generating a second signal that contains said second substitute value, said second conversion constant and said pattern-conversion constant that corresponds to said third conversion constant, and a transmission process of sending the first signal and second signal; and a transmission unit that sends said first signal and said second signal.

20. The apparatus of claim 19 wherein said control unit uses said second conversion constant and said third conversion constant to encrypt said transmission data to said first substitute value, and uses said first conversion constant and said third conversion constant to encrypt said transmission data to said second substitute value.

21. The apparatus of claim 19 wherein said control unit uses said second conversion constant to encrypt said transmission data to said first substitute value, and uses said first conversion constant and said third conversion constant to encrypt said transmission data to said second substitute value.

22. The apparatus of claim 19 wherein said control unit uses said second conversion constant and said third conversion constant to encrypt said transmission data to said first substitute value, and uses said first conversion constant to encrypt said transmission data to said second substitute value.

23. An apparatus that sends data that has been encrypted using two conversion constants from among a first conversion constant, a second conversion constant, a third conversion constant, and a fourth conversion constant, and comprising:

a memory unit that stores at least first and second pattern-conversion constants that correspond to the third and fourth conversion constants;

a control unit, which performs a conversion-constant-selection process of selecting said first conversion constant, said second conversion constant, said third conversion constant and said fourth conversion constant, an encryption process of using said second conversion constant and said fourth conversion constant to encrypt said transmission data to a first substitute value, and using said first conversion constant and said third conversion constant to encrypt said transmission data to a second substitute value, a first-signal-generation process of generating a first signal that contains said first substitute value, said first conversion constant, and the first or second pattern-conversion constant that respectively corresponds to said third conversion constant or said fourth conversion constant, and a second-signal-generation process of generating a second signal that contains said second substitute value, said second conversion constant, and the first or second pattern-conversion constant that respectively corresponds to said third conversion constant or said fourth conversion constant that is not contained in said first signal; and a transmission unit that sends said first signal and said second signal.

24. An apparatus that transfers a signal that contains pattern-conversion constants corresponding to the conversion constants that are used in encrypting the transmission data, and comprising:
- a memory unit that stores the pattern-conversion constants that correspond to said conversion constants;
- a transmission/reception unit that sends and receives said signal; and
- a control unit that performs:
  - a signal-generation process of converting said pattern-conversion constants contained in said received signal to said conversion constants to convert said signal, and
  - a process of transferring said converted signal.

25. An apparatus that receives a first signal and a second' signal that each contain transmission data that was encrypted using at least one conversion constant from among a first conversion constant, a second conversion constant and a third conversion constant, and that decodes the transmission data, wherein the apparatus comprises:
- a receiving unit that receives said first signal and said second' signal, wherein
  said first signal contains a first substitute value, which is said transmission data that has been encrypted using said second conversion constant, or said second conversion constant and said third conversion constant, and said first conversion constant, and
  said second' signal contains, a second substitute value, which is said transmission data that has been encrypted using said first conversion constant, or said first conversion constant and said third conversion constant, said second conversion constant and said third conversion constant; and
- a control unit that performs:
  - a process of reading said first substitute value and said first conversion constant from said first signal, and reading said second substitute value, said second conversion constant and said third conversion constant from said second' signal;
  - a decoding process of using the conversion constants that were used for encrypting said first substitute value and said second substitute value to decode said first substitute value and said second substitute value to first decoded data and second decoded data, respectively; and
  - an authentication process of authenticating said first signal and said second' signal from said first decoded data and said second decoded data.

26. An apparatus that receives a first' signal and a second' signal, which contain transmission data that has been encrypted using two conversion constants from among a first conversion constant, a second conversion constant, a third conversion constant, and a fourth conversion constant, and that decodes the transmission data, the apparatus comprising:
- a reception unit that receives said first' signal and said second' signal wherein
  said first signal' contains a first substitute value, which is said transmission data that has been encrypted using said second conversion constant and said fourth conversion constant, said first conversion constant and said third conversion constant or said fourth conversion constant, and
  said second' signal contains a second substitute value, which is said transmission data that has been encrypted using said first conversion constant and said third conversion constant, said second conversion constant and said third conversion constant or said fourth conversion constant that is not contained in said first' signal; and
- a control unit that performs:
  - a reading process of reading said first substitute value, said first conversion constant and said third conversion constant or said fourth conversion constant from said first' signal, and reading said second substitute value, said second conversion constant and said third conversion constant or said fourth conversion constant from the said second' signal;
  - a decoding process of using the conversion constants that were used to encrypt said first substitute value and said second substitute value to decode said first substitute value and said second substitute value to first decoded data and second decoded data, respectively: and
  - an authentication process of authenticating said first' signal and said second' signal from said first decoded data and said second decoded data.

27. An apparatus that receives a first signal and a second signal that contains transmission data that has been encrypted using at least one conversion constant from among a first conversion constant, a second conversion constant, and a third conversion constant, and that decodes the transmission data, the apparatus comprising:
- a memory unit that stores pattern-conversion constants that correspond to said conversion constants;
- a reception unit that receives said first signal and said second signal, wherein
  said first signal contains a first substitute value that was encrypted using said second conversion constant or said second conversion constant and said third conversion constant, and the first conversion constant, and
  said second signal contains a second substitute value that was encrypted using said first conversion constant or said first conversion constant and said third conversion constant, said second conversion constant, and a pattern-conversion constant that corresponds to said third conversion constant; and
- a control unit that performs:
  - a reading process of reading said first substitute value and said first conversion constant from said first signal, and reading said second substitute value, said second conversion constant and said pattern-conversion constant from said second signal;
  - an acquisition process of acquiring said third conversion constant from said read pattern-conversion constant;
  - a decoding process of using the conversion constants that were used to encrypt said first substitute value and said second substitute value to decode said first substitute value and said second substitute value to first decoded data and second decoded data, respectively; and
  - an authentication process of authenticating said first signal and said second signal from said first decoded data and said second decoded data.

28. The apparatus of any one of the claims 25 to 27 wherein said control unit sends a drive signal for driving an external-drive apparatus based on said first decoded data or said second decoded data.

29. The apparatus of any one of the claims 25 to 27 wherein said control unit performs said authentication when said first decoded data and said second decoded data match.

* * * * *